(12) United States Patent
Cutler et al.

(10) Patent No.: US 10,951,859 B2
(45) Date of Patent: Mar. 16, 2021

(54) VIDEOCONFERENCING DEVICE AND METHOD

(71) Applicant: MICROSOFT TECHNOLOGY LICENSING, LLC, Redmond, WA (US)

(72) Inventors: Ross Garrett Cutler, Clyde Hill, WA (US); Antti Kelloniemi, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/993,569

(22) Filed: May 30, 2018

(65) Prior Publication Data
US 2019/0373216 A1 Dec. 5, 2019

(51) Int. Cl.
*H04N 7/15* (2006.01)
*H04N 5/262* (2006.01)
(Continued)

(52) U.S. Cl.
CPC .............. *H04N 7/15* (2013.01); *H04N 5/2628* (2013.01); *H04N 5/607* (2013.01); *H04N 7/142* (2013.01);
(Continued)

(58) Field of Classification Search
CPC combination set(s) only.
See application file for complete search history.

(56) References Cited

U.S. PATENT DOCUMENTS

| 3,118,340 A | 1/1964 | Iwerks et al. |
| 4,611,342 A | 9/1986 | Miller et al. |

(Continued)

FOREIGN PATENT DOCUMENTS

| CN | 101072332 A | 11/2007 |
| CN | 101282452 A | 10/2008 |

(Continued)

OTHER PUBLICATIONS

"Acoustic Echo Canceller Data Sheet", In Miket Dsp Solutions Data Sheet, Oct. 3, 2004, 49 Pages.
"Acoustic Echo Canceller Demo Using the Block Frequency Domain Adaptive Filter Algorithm", Retrieved From: https://web.archive.org/web/20070407005509/https://www.dspalgorithms.com/bfdafaec/bfdafaec11.html, Retrieved on: Apr. 7, 2007, 8 Pages.
"EF400", Retrieved From: https://web.archive.org/web/20070205093444/http://www.aspi.com/products/echofree/ef400.html, Retrieved on: Feb. 5, 2007, 2 Pages.
(Continued)

*Primary Examiner* — Phung-Hoang J Nguyen
(74) *Attorney, Agent, or Firm* — NovoTechIP International PLLC

(57) ABSTRACT

A first device is disclosed, which is located at a first site and in communication with a second device located at a second site geographically separated from the first site. The first device includes a controller configured to automatically control selection of a view defining an area of the second site to be displayed by the first device. The controller automatically selects the view based on a display configuration of the first device. The controller is also configured to automatically control selection of a sound of the second site to be rendered by the first device. The controller automatically selecting the sound based on the selected view. The first device also includes a display configured to display the selected view of the second site based on a video image of the second site captured by the second device. The display has the display configuration. The first device further includes a speaker configured to render the selected sound of the second site based on an audio of the second site captured by the second device.

20 Claims, 13 Drawing Sheets

(51) Int. Cl.
*H04N 5/60* (2006.01)
*H04N 7/14* (2006.01)
*H04N 21/422* (2011.01)

(52) U.S. Cl.
CPC ....... *H04N 7/147* (2013.01); *H04N 21/42204* (2013.01)

(56) References Cited

U.S. PATENT DOCUMENTS

| | | |
|---|---|---|
| 4,658,425 A | 4/1987 | Julstrom |
| 4,752,961 A | 6/1988 | Kahn |
| 4,929,824 A | 5/1990 | Miyazaki |
| 4,980,761 A | 12/1990 | Natori |
| 5,021,818 A | 6/1991 | Satoh et al. |
| 5,033,087 A | 7/1991 | Bahl et al. |
| 5,121,426 A | 6/1992 | Baumhauer et al. |
| 5,206,721 A | 4/1993 | Ashida et al. |
| 5,264,940 A | 11/1993 | Komiya et al. |
| 5,271,057 A | 12/1993 | Addeo et al. |
| 5,281,995 A | 1/1994 | Terashita et al. |
| 5,307,405 A | 4/1994 | Sih |
| 5,335,011 A | 8/1994 | Addeo et al. |
| 5,343,246 A | 8/1994 | Arai et al. |
| 5,353,058 A | 10/1994 | Takei |
| 5,382,972 A | 1/1995 | Kannes |
| 5,404,397 A | 4/1995 | Janse et al. |
| 5,412,738 A | 5/1995 | Brunelli et al. |
| 5,436,896 A | 7/1995 | Anderson et al. |
| 5,450,481 A | 9/1995 | Penzias |
| 5,539,483 A | 7/1996 | Nalwa |
| 5,561,668 A | 10/1996 | Genter |
| 5,572,278 A | 11/1996 | Hamada et al. |
| 5,572,728 A | 11/1996 | Tada et al. |
| 5,587,998 A | 12/1996 | Velardo et al. |
| 5,625,410 A | 4/1997 | Washino et al. |
| 5,631,697 A | 5/1997 | Nishimura et al. |
| 5,686,957 A | 11/1997 | Baker |
| 5,710,591 A | 1/1998 | Bruno et al. |
| 5,737,011 A | 4/1998 | Lukacs |
| 5,745,305 A | 4/1998 | Nalwa |
| 5,751,285 A | 5/1998 | Kashiwagi et al. |
| 5,767,897 A | 6/1998 | Howell |
| 5,778,082 A | 7/1998 | Chu et al. |
| 5,787,183 A | 7/1998 | Chu et al. |
| 5,790,182 A | 8/1998 | St. Hilaire |
| 5,793,527 A | 8/1998 | Nalwa |
| 5,796,819 A | 8/1998 | Romesburg |
| 5,808,663 A | 9/1998 | Okaya |
| 5,818,514 A | 10/1998 | Duttweiler et al. |
| 5,844,599 A | 12/1998 | Hildin |
| 5,850,250 A | 12/1998 | Konopka et al. |
| 5,877,801 A | 3/1999 | Martin et al. |
| 5,959,662 A | 9/1999 | Shaffer et al. |
| 5,959,667 A | 9/1999 | Maeng |
| 5,963,250 A | 10/1999 | Parker et al. |
| 5,990,934 A | 11/1999 | Nalwa |
| 5,999,208 A | 12/1999 | McNerney et al. |
| 5,999,630 A | 12/1999 | Iwamatsu |
| 6,002,430 A | 12/1999 | McCall et al. |
| 6,005,610 A | 12/1999 | Pingali |
| 6,005,611 A | 12/1999 | Gullichsen et al. |
| 6,040,860 A | 3/2000 | Tamura et al. |
| 6,043,837 A | 3/2000 | Driscoll et al. |
| 6,072,522 A | 6/2000 | Ippolito et al. |
| 6,111,702 A | 8/2000 | Nalwa |
| 6,115,176 A | 9/2000 | Nalwa |
| 6,118,474 A | 9/2000 | Nayar |
| 6,128,143 A | 10/2000 | Nalwa |
| 6,133,941 A | 10/2000 | Ono |
| 6,141,145 A | 10/2000 | Nalwa |
| 6,144,501 A | 11/2000 | Nalwa |
| 6,157,403 A | 12/2000 | Nagata |
| 6,175,454 B1 | 1/2001 | Hoogland et al. |
| 6,179,426 B1 | 1/2001 | Rodriguez et al. |
| 6,192,196 B1 | 2/2001 | Keller |
| 6,192,342 B1 | 2/2001 | Akst |
| 6,195,204 B1 | 2/2001 | Nalwa |
| 6,208,963 B1 | 3/2001 | Martinez et al. |
| 6,211,912 B1 | 4/2001 | Shahraray |
| 6,219,086 B1 | 4/2001 | Murata |
| 6,219,089 B1 | 4/2001 | Driscoll et al. |
| 6,219,090 B1 | 4/2001 | Nalwa |
| 6,219,639 B1 | 4/2001 | Bakis et al. |
| 6,219,640 B1 | 4/2001 | Basu et al. |
| 6,222,683 B1 | 4/2001 | Hoogland et al. |
| 6,275,258 B1 | 8/2001 | Chim |
| 6,285,365 B1 | 9/2001 | Nalwa |
| 6,285,392 B1 | 9/2001 | Satoda et al. |
| 6,304,285 B1 | 10/2001 | Geng |
| 6,313,865 B1 | 11/2001 | Driscoll et al. |
| 6,331,869 B1 | 12/2001 | Furlan et al. |
| 6,337,708 B1 | 1/2002 | Furlan et al. |
| 6,341,044 B1 | 1/2002 | Driscoll et al. |
| 6,346,950 B1 | 2/2002 | Jouppi |
| 6,346,967 B1 | 2/2002 | Gullichsen et al. |
| 6,353,662 B1 | 3/2002 | Foladare et al. |
| 6,356,296 B1 | 3/2002 | Driscoll et al. |
| 6,356,397 B1 | 3/2002 | Nalwa |
| 6,369,818 B1 | 4/2002 | Hoffman et al. |
| 6,373,642 B1 | 4/2002 | Wallerstein et al. |
| 6,377,918 B1 | 4/2002 | Series |
| 6,377,919 B1 | 4/2002 | Burnett et al. |
| 6,388,820 B1 | 5/2002 | Wallerstein et al. |
| 6,392,687 B1 | 5/2002 | Driscoll et al. |
| 6,405,166 B1 | 6/2002 | Huang et al. |
| 6,424,377 B1 | 7/2002 | Driscoll et al. |
| 6,426,774 B1 | 7/2002 | Driscoll et al. |
| 6,442,272 B1 | 8/2002 | Osovets |
| 6,459,451 B2 | 10/2002 | Driscoll et al. |
| 6,466,254 B1 | 10/2002 | Furlan et al. |
| 6,469,217 B2 | 10/2002 | Saito et al. |
| 6,469,732 B1 | 10/2002 | Chang et al. |
| 6,480,229 B1 | 11/2002 | Driscoll et al. |
| 6,480,300 B1 | 11/2002 | Aoyama |
| 6,483,532 B1 | 11/2002 | Girod |
| 6,493,032 B1 | 12/2002 | Wallerstein et al. |
| 6,515,696 B1 | 2/2003 | Driscoll et al. |
| 6,539,547 B2 | 3/2003 | Driscoll et al. |
| 6,545,699 B2 | 4/2003 | Satoda |
| 6,549,230 B2 | 4/2003 | Tosaya |
| 6,577,333 B2 | 6/2003 | Tai et al. |
| 6,583,815 B1 | 6/2003 | Driscoll et al. |
| 6,593,956 B1 | 7/2003 | Potts et al. |
| 6,593,969 B1 | 7/2003 | Driscoll et al. |
| 6,597,520 B2 | 7/2003 | Wallerstein et al. |
| 6,600,511 B1 | 7/2003 | Kaneko et al. |
| 6,611,281 B2 | 8/2003 | Strubbe |
| 6,611,601 B2 | 8/2003 | Terada et al. |
| 6,618,073 B1 | 9/2003 | Lambert et al. |
| 6,628,767 B1 | 9/2003 | Wellner et al. |
| 6,700,711 B2 | 3/2004 | Nalwa |
| 6,731,334 B1 | 5/2004 | Maeng et al. |
| 6,741,250 B1 | 5/2004 | Furlan et al. |
| 6,756,990 B2 | 6/2004 | Koller |
| 6,757,442 B1 | 6/2004 | Avinash |
| 6,766,035 B1 | 7/2004 | Gutta |
| 6,771,819 B2 | 8/2004 | DeYong et al. |
| 6,774,934 B1 | 8/2004 | Belt et al. |
| 6,795,106 B1 | 9/2004 | Cooper |
| 6,826,284 B1 | 11/2004 | Benesty et al. |
| 6,839,067 B2 | 1/2005 | Liu et al. |
| 6,842,516 B1 | 1/2005 | Armbruster |
| 6,844,990 B2 | 1/2005 | Artonne et al. |
| 6,868,157 B1 | 3/2005 | Okuda |
| 6,882,971 B2 | 4/2005 | Craner |
| 6,885,509 B2 | 4/2005 | Wallerstein et al. |
| 6,904,182 B1 | 6/2005 | Simard et al. |
| 6,914,622 B1 | 7/2005 | Smith et al. |
| 6,914,989 B2 | 7/2005 | Janse et al. |
| 6,922,403 B1 | 7/2005 | Yoo |
| 6,924,832 B1 | 8/2005 | Shifter et al. |
| 6,934,370 B1 | 8/2005 | Leban et al. |
| 6,937,266 B2 | 8/2005 | Rui et al. |
| 6,937,744 B1 | 8/2005 | Toyama |

(56) References Cited

U.S. PATENT DOCUMENTS

| | | |
|---|---|---|
| 6,940,540 B2 | 9/2005 | Beal et al. |
| 6,950,141 B2 | 9/2005 | Mori et al. |
| 6,968,064 B1 | 11/2005 | Ning |
| 6,970,796 B2 | 11/2005 | Tashev |
| 6,987,856 B1 | 1/2006 | Feng et al. |
| 7,010,119 B2 | 3/2006 | Marton et al. |
| 7,020,337 B2 | 3/2006 | Viola et al. |
| 7,024,033 B2 | 4/2006 | Li et al. |
| 7,031,499 B2 | 4/2006 | Viola et al. |
| 7,039,199 B2 | 5/2006 | Rui |
| 7,081,915 B1 | 7/2006 | Hamilton |
| 7,084,801 B2 | 8/2006 | Balan et al. |
| 7,092,001 B2 | 8/2006 | Schulz |
| 7,092,002 B2 | 8/2006 | Ferren et al. |
| 7,099,510 B2 | 8/2006 | Jones et al. |
| 7,099,821 B2 | 8/2006 | Visser et al. |
| 7,102,669 B2 | 9/2006 | Skow |
| 7,113,201 B1 | 9/2006 | Taylor et al. |
| 7,116,791 B2 | 10/2006 | Matsuo |
| 7,117,157 B1 | 10/2006 | Taylor et al. |
| 7,119,829 B2 | 10/2006 | Leonard et al. |
| 7,123,727 B2 | 10/2006 | Elko et al. |
| 7,127,071 B2 | 10/2006 | Rui et al. |
| 7,133,530 B2 | 11/2006 | Poletti |
| 7,149,315 B2 | 12/2006 | Johnston et al. |
| 7,158,645 B2 | 1/2007 | June et al. |
| 7,174,029 B2 | 2/2007 | Agostinelli et al. |
| 7,197,186 B2 | 3/2007 | Jones et al. |
| 7,203,323 B2 | 4/2007 | Tashev |
| 7,206,809 B2 | 4/2007 | Ludwig et al. |
| 7,212,651 B2 | 5/2007 | Viola et al. |
| 7,242,763 B2 | 7/2007 | Etter |
| 7,242,810 B2 | 7/2007 | Chang |
| 7,260,257 B2 | 8/2007 | Zhang et al. |
| 7,305,078 B2 | 12/2007 | Kardos |
| 7,343,289 B2 | 3/2008 | Cutler et al. |
| 7,349,005 B2 | 3/2008 | Rui et al. |
| 7,362,368 B2 | 4/2008 | Steinberg et al. |
| 7,403,231 B2 | 7/2008 | Kawanishi |
| 7,428,000 B2 | 9/2008 | Cutler et al. |
| 7,430,333 B2 | 9/2008 | Yu et al. |
| 7,454,010 B1 | 11/2008 | Ebenezer |
| 7,508,413 B2 | 3/2009 | Nose |
| 7,515,172 B2 | 4/2009 | Rui et al. |
| 7,538,802 B2 | 5/2009 | Lee |
| 7,542,600 B2 | 6/2009 | Yu et al. |
| 7,559,026 B2 | 7/2009 | Girish et al. |
| 7,570,785 B2 | 8/2009 | Breed |
| 7,580,054 B2 | 8/2009 | Rui et al. |
| 7,586,513 B2 | 9/2009 | Muren et al. |
| 7,613,313 B2 | 11/2009 | Juppi et al. |
| 7,636,662 B2 | 12/2009 | Dimtrova et al. |
| 7,742,055 B2 | 6/2010 | Phelps |
| 7,778,483 B2 | 8/2010 | Messina et al. |
| 7,782,366 B2 | 8/2010 | Imai |
| 7,796,831 B2 | 9/2010 | Tanaka |
| 7,876,367 B2 | 1/2011 | Muramatsu |
| 7,948,524 B2 | 5/2011 | Endo et al. |
| 8,024,189 B2 | 9/2011 | Zhang et al. |
| 8,111,282 B2 | 2/2012 | Cutler et al. |
| 8,189,807 B2 | 5/2012 | Cutler |
| 8,219,387 B2 | 7/2012 | Cutler et al. |
| 8,234,113 B2 | 7/2012 | Zhang et al. |
| 8,248,448 B2 | 8/2012 | Feng et al. |
| 8,300,080 B2 | 10/2012 | Cutler |
| 8,314,829 B2 | 11/2012 | Cutler |
| 8,315,366 B2 | 11/2012 | Basart et al. |
| 8,465,416 B2 | 6/2013 | Kitano et al. |
| 8,510,110 B2 | 8/2013 | Zhang et al. |
| 8,526,632 B2 | 9/2013 | Cutler |
| 8,576,272 B2 | 11/2013 | Wu et al. |
| 8,614,734 B2 | 12/2013 | Cutler |
| 8,717,402 B2 | 5/2014 | Cutler |
| 8,749,650 B2 | 6/2014 | Cutler |
| 8,773,499 B2 | 7/2014 | Watson et al. |
| 9,071,895 B2 | 6/2015 | Cutler |
| 9,307,191 B2 | 4/2016 | Berrett et al. |
| 9,621,795 B1 | 4/2017 | Whyte et al. |
| 9,648,346 B2 | 5/2017 | Zhang et al. |
| 9,883,140 B2 | 1/2018 | Johnson et al. |
| 9,980,040 B2 | 5/2018 | Whyte et al. |
| 2001/0028719 A1 | 10/2001 | Hayashi |
| 2001/0046309 A1 | 11/2001 | Kamei |
| 2001/0052422 A1 | 12/2001 | Kobayashi et al. |
| 2002/0033791 A1 | 3/2002 | Arakawa |
| 2002/0034020 A1 | 3/2002 | Wallerstein et al. |
| 2002/0052735 A1 | 5/2002 | Nagano et al. |
| 2002/0063802 A1 | 5/2002 | Gullichsen et al. |
| 2002/0094132 A1 | 7/2002 | Hoffman et al. |
| 2002/0097885 A1 | 7/2002 | Birchfield et al. |
| 2002/0101505 A1 | 8/2002 | Gutta et al. |
| 2002/0105598 A1 | 8/2002 | Tai et al. |
| 2002/0140804 A1 | 10/2002 | Colmenarez et al. |
| 2002/0154417 A1 | 10/2002 | Wallerstein et al. |
| 2002/0172350 A1 | 11/2002 | Edwards et al. |
| 2002/0184012 A1 | 12/2002 | Burnett et al. |
| 2002/0191071 A1 | 12/2002 | Rui et al. |
| 2002/0196327 A1 | 12/2002 | Rui et al. |
| 2003/0018475 A1 | 1/2003 | Basu et al. |
| 2003/0037109 A1 | 2/2003 | Newman et al. |
| 2003/0043260 A1 | 3/2003 | Yap et al. |
| 2003/0059061 A1 | 3/2003 | Tsuji et al. |
| 2003/0088832 A1 | 5/2003 | Agostinelli et al. |
| 2003/0110147 A1 | 6/2003 | Li et al. |
| 2003/0118200 A1 | 6/2003 | Beaucoup et al. |
| 2003/0123659 A1 | 7/2003 | Forstrom et al. |
| 2003/0142402 A1 | 7/2003 | Carbo et al. |
| 2003/0160862 A1 | 8/2003 | Charlier et al. |
| 2003/0174146 A1* | 9/2003 | Kenoyer ............... H04N 7/147 345/619 |
| 2003/0184645 A1 | 10/2003 | Biegelsen et al. |
| 2003/0185424 A1 | 10/2003 | Sato et al. |
| 2003/0187632 A1 | 10/2003 | Menich |
| 2003/0193606 A1 | 10/2003 | Driscoll et al. |
| 2003/0193607 A1 | 10/2003 | Driscoll et al. |
| 2003/0198328 A1 | 10/2003 | Li |
| 2003/0220971 A1 | 11/2003 | Kressin |
| 2003/0234772 A1 | 12/2003 | Zhang et al. |
| 2004/0001137 A1 | 1/2004 | Cutler et al. |
| 2004/0008407 A1 | 1/2004 | Wallerstein et al. |
| 2004/0008423 A1 | 1/2004 | Driscoll et al. |
| 2004/0021764 A1 | 2/2004 | Driscoll et al. |
| 2004/0032796 A1 | 2/2004 | Chu et al. |
| 2004/0101038 A1 | 5/2004 | Etter |
| 2004/0120510 A1 | 6/2004 | Leblanc |
| 2004/0170164 A1 | 9/2004 | Leblanc et al. |
| 2004/0172255 A1 | 9/2004 | Aoki et al. |
| 2004/0201698 A1 | 10/2004 | Keenan et al. |
| 2004/0228215 A1 | 11/2004 | Ichikawa et al. |
| 2004/0228474 A1 | 11/2004 | Taniguchi et al. |
| 2004/0243416 A1 | 12/2004 | Gardos |
| 2004/0252384 A1 | 12/2004 | Wallerstein et al. |
| 2004/0252845 A1 | 12/2004 | Tashev |
| 2004/0254982 A1 | 12/2004 | Hoffman et al. |
| 2004/0263636 A1 | 12/2004 | Cutler et al. |
| 2004/0267521 A1 | 12/2004 | Cutler et al. |
| 2005/0008169 A1 | 1/2005 | Muren et al. |
| 2005/0018828 A1 | 1/2005 | Nierhaus et al. |
| 2005/0046703 A1 | 3/2005 | Cutler |
| 2005/0057666 A1 | 3/2005 | Hu et al. |
| 2005/0117015 A1 | 6/2005 | Cutler |
| 2005/0117034 A1 | 6/2005 | Cutler |
| 2005/0140779 A1 | 6/2005 | Schulz et al. |
| 2005/0151837 A1 | 7/2005 | Cutler |
| 2005/0157866 A1 | 7/2005 | Marton et al. |
| 2005/0175216 A1 | 8/2005 | Bloom et al. |
| 2005/0178953 A1 | 8/2005 | Worthington et al. |
| 2005/0228673 A1 | 10/2005 | Nefian et al. |
| 2005/0246167 A1 | 11/2005 | Nakajima et al. |
| 2005/0262201 A1 | 11/2005 | Rudolph et al. |
| 2005/0265562 A1 | 12/2005 | Rui |
| 2005/0265607 A1 | 12/2005 | Chang |
| 2005/0276270 A1 | 12/2005 | Buinevicius et al. |
| 2005/0278171 A1 | 12/2005 | Suppappola et al. |

(56) References Cited

U.S. PATENT DOCUMENTS

| | | |
|---|---|---|
| 2005/0280700 A1 | 12/2005 | Rui et al. |
| 2005/0285933 A1 | 12/2005 | Rui et al. |
| 2005/0285943 A1 | 12/2005 | Cutler |
| 2005/0286724 A1 | 12/2005 | Yamada et al. |
| 2006/0017805 A1 | 1/2006 | Rodman |
| 2006/0023075 A1 | 2/2006 | Cutler |
| 2006/0075422 A1 | 4/2006 | Choi et al. |
| 2006/0133619 A1* | 6/2006 | Curry .............. H04M 3/56 381/26 |
| 2006/0146177 A1 | 7/2006 | Cutler |
| 2006/0147063 A1 | 7/2006 | Chen |
| 2006/0204023 A1 | 9/2006 | Stinson et al. |
| 2006/0221915 A1 | 10/2006 | Gatta et al. |
| 2006/0233353 A1 | 10/2006 | Beaucoup et al. |
| 2006/0239443 A1 | 10/2006 | Oxford et al. |
| 2007/0035632 A1 | 2/2007 | Silvernail et al. |
| 2007/0036343 A1 | 2/2007 | Sudo et al. |
| 2007/0047442 A1 | 3/2007 | Snyder |
| 2007/0058879 A1 | 3/2007 | Cutler et al. |
| 2007/0127819 A1 | 6/2007 | Lee et al. |
| 2007/0136053 A1 | 6/2007 | Ebenezer |
| 2007/0160357 A1 | 7/2007 | Lin et al. |
| 2007/0206875 A1 | 9/2007 | Ida et al. |
| 2007/0263849 A1 | 11/2007 | Stokes et al. |
| 2007/0266092 A1 | 11/2007 | Schweitzer, III |
| 2007/0297682 A1 | 12/2007 | Zhang et al. |
| 2008/0037802 A1 | 2/2008 | Posa et al. |
| 2008/0069403 A1 | 3/2008 | Breed |
| 2008/0089552 A1 | 4/2008 | Nakamura et al. |
| 2008/0107281 A1 | 5/2008 | Togami et al. |
| 2008/0112598 A1 | 5/2008 | Gabara |
| 2008/0127260 A1 | 5/2008 | Hong et al. |
| 2008/0143819 A1 | 6/2008 | Rodman et al. |
| 2008/0170717 A1 | 7/2008 | Liu et al. |
| 2008/0184124 A1 | 7/2008 | Agarwal et al. |
| 2008/0232608 A1* | 9/2008 | Ullmann ............ G01S 15/04 381/77 |
| 2008/0247565 A1 | 10/2008 | Elko et al. |
| 2008/0255840 A1 | 10/2008 | Cutler |
| 2008/0273683 A1 | 11/2008 | Cohen et al. |
| 2008/0292140 A1 | 11/2008 | Morris et al. |
| 2009/0002476 A1 | 1/2009 | Cutler |
| 2009/0002477 A1 | 1/2009 | Cutler |
| 2009/0002480 A1 | 1/2009 | Cutler |
| 2009/0003678 A1 | 1/2009 | Cutler |
| 2009/0046139 A1 | 2/2009 | Cutler et al. |
| 2009/0073275 A1 | 3/2009 | Awazu |
| 2009/0150149 A1 | 6/2009 | Culter et al. |
| 2009/0322915 A1 | 12/2009 | Cutler |
| 2009/0323981 A1 | 12/2009 | Cutler |
| 2010/0039497 A1 | 2/2010 | Cutler |
| 2010/0123770 A1 | 5/2010 | Friel et al. |
| 2010/0142815 A1 | 6/2010 | Sim |
| 2010/0150360 A1 | 6/2010 | Beaucoup |
| 2010/0245624 A1 | 9/2010 | Beaucoup |
| 2011/0085017 A1 | 4/2011 | Robinson et al. |
| 2011/0090311 A1 | 4/2011 | Fang et al. |
| 2011/0096140 A1 | 4/2011 | Samadani et al. |
| 2011/0164141 A1 | 7/2011 | Tico et al. |
| 2011/0242277 A1 | 10/2011 | Do et al. |
| 2011/0249101 A1 | 10/2011 | Nguyen et al. |
| 2011/0313766 A1 | 12/2011 | Zhang et al. |
| 2012/0026277 A1 | 2/2012 | Malzbender et al. |
| 2012/0038627 A1 | 2/2012 | Sung et al. |
| 2012/0050458 A1 | 3/2012 | Mauchly et al. |
| 2012/0216129 A1 | 8/2012 | Ng et al. |
| 2012/0218371 A1 | 8/2012 | Cutler |
| 2012/0262536 A1 | 10/2012 | Chen et al. |
| 2012/0274736 A1 | 11/2012 | Robinson et al. |
| 2012/0278077 A1 | 11/2012 | Zhang et al. |
| 2012/0327179 A1 | 12/2012 | Watson et al. |
| 2013/0027506 A1 | 1/2013 | Cutler |
| 2013/0063539 A1* | 3/2013 | Sakuraba ............ H04N 7/142 348/14.02 |
| 2013/0271559 A1* | 10/2013 | Feng ................ H04N 7/142 348/14.08 |
| 2014/0133665 A1 | 5/2014 | Xiang et al. |
| 2014/0184727 A1 | 7/2014 | Xiao et al. |
| 2014/0205270 A1 | 7/2014 | Kelly et al. |
| 2015/0116451 A1 | 4/2015 | Xu et al. |
| 2015/0189455 A1* | 7/2015 | Donaldson ............ H04R 1/20 381/77 |
| 2016/0219248 A1* | 7/2016 | Reznik ............ H04N 21/2343 |
| 2017/0195815 A1* | 7/2017 | Christoph ............ H04S 7/303 |
| 2017/0201825 A1 | 7/2017 | Whyte et al. |
| 2018/0165520 A1* | 6/2018 | Meisser ............ H04N 7/181 |

FOREIGN PATENT DOCUMENTS

| | | |
|---|---|---|
| CN | 201426153 Y | 3/2010 |
| EP | 0821522 A2 | 1/1998 |
| EP | 1377041 A2 | 1/2004 |
| EP | 1443498 A1 | 8/2004 |
| EP | 1587294 A1 | 10/2005 |
| EP | 1677535 A1 | 7/2006 |
| JP | S5972295 A | 4/1984 |
| JP | H06276514 A | 9/1994 |
| JP | H08125835 A | 5/1996 |
| JP | H09307870 A | 11/1997 |
| JP | H10304329 A | 11/1998 |
| JP | 2001296343 A | 10/2001 |
| JP | 2003304589 A | 10/2003 |
| JP | 2004032782 A | 1/2004 |
| JP | 2005523667 A | 8/2005 |
| JP | 2007005969 A | 1/2007 |
| KR | 20000044065 A | 7/2000 |
| KR | 20000044079 A | 7/2000 |
| KR | 200354365 Y1 | 6/2004 |
| WO | 9607979 A1 | 3/1996 |
| WO | 9847291 A3 | 1/1999 |
| WO | 0013419 A1 | 3/2000 |
| WO | 0137552 A1 | 5/2001 |
| WO | 2005122632 A1 | 12/2005 |
| WO | 2006030995 A1 | 3/2006 |
| WO | 2007003061 A1 | 1/2007 |
| WO | 2009006004 A1 | 1/2009 |
| WO | 2017195514 A1 | 11/2017 |
| WO | 2018025458 A1 | 2/2018 |
| WO | 2018075090 A1 | 4/2018 |

OTHER PUBLICATIONS

"Microphone Array Project in Microsoft Research", Retrieved From: https://web.archive.org/web/20071215030921/http://research.microsoft.com/users/ivantash/MicrophoneArrayProject.aspx, Retrieved on: Nov. 5, 2007, 3 Pages.

"Microsoft Eyes Future of Teleconferencing With RoundTable", Retrieved From: http://ducknetweb.blogspot.com/2007/09/microsoft-eyes-future-of.html, Sep. 13, 2007, 6 Pages.

"Microsoft RoundTable", Retrieved From: http://www.fullview.com/Microsoft_RoundTable_Datasheet.pdf, Aug. 16, 2007, 2 Pages.

"Revolabs Solo Desktop Wireless Conference Microphone System", Retrieved From: https://web.archive.org/web/20080519230321/http://www.goelectronic.com/Merchant2/merchant.mvc?Screen=PROD&Product_Code=REVOLABS+SOLO+DESKTOP, Retrieved on: May 19, 2008, 2 Pages.

"Office Action Issued in European Patent Application No. 078356981", dated Mar. 22, 2011, 4 Pages.

"Search Report Issued in European Patent Application No. 07835698.7", dated Jul. 22, 2010, 8 Pages.

"Office Action Issued in European Patent Application No. 08769995.5", dated Jan. 23, 2012, 4 Pages.

"Search Report Issued in European Patent Application No. 08769995.5", dated Feb. 10, 2011, 5 Pages.

"Search Report Issued in European Patent Application No. 08771122.2", dated Jun. 25, 2014, 7 Pages.

"Final Office Action Issued in U.S. Appl. No. 09/681,843", dated Jun. 18, 2003, 15 Pages.

(56) References Cited

OTHER PUBLICATIONS

"Final Office Action Issued in U.S. Appl. No. 09/681,843", dated Dec. 28, 2004, 14 Pages.
"Non Final Office Action Issued in U.S. Appl. No. 09/681,843", dated Nov. 10, 2003, 15 Pages.
"Non Final Office Action Issued in U.S. Appl. No. 09/681,843", dated May 6, 2004, 16 Pages.
"Non Final Office Action Issued in U.S. Appl. No. 09/681,843", dated Jul. 5, 2002, 12 Pages.
"Non Final Office Action Issued in U.S. Appl. No. 09/681,843", dated Dec. 31, 2002, 12 Pages.
"Final Office Action Issued in U.S. Appl. No. 10/608,313", dated Jul. 5, 2007, 20 Pages.
"Non-Final Office Action Issued in U.S. Appl. No. 10/608,313", dated Feb. 8, 2007, 16 Pages.
"Non-Final Office Action Issued in U.S. Appl. No. 10/608,313", dated Sep. 28, 2007, 21 Pages.
"Notice of Allowance Issued in Korean Patent Application No. 10-2008-7030540", dated Sep. 27, 2013, 3 Pages.
"Office Action Issued in Korean Patent Application No. 10-2008-7030540", dated Apr. 19, 2013, 4 Pages.
"Notice of Allowance Issued in Korean Patent Application No. 10-2009-7026719", dated Nov. 20, 2014, 3 Pages.
"Office Action Issued in Korean Patent Application No. 10-2009-7026719", dated May 30, 2014, 4 Pages.
"Notice of Allowance Issued in Korean Patent Application No. 10-2009-7027254", dated Nov. 26, 2014, 3 Pages.
"Office Action Issued in Korean Patent Application No. 10-2009-7027254", dated Jun. 18, 2014, 4 Pages.
"Non Final Office Action Issued in U.S. Appl. No. 11/193,702", dated May 23, 2008, 18 Pages.
"Ex-parte Quayle Action Issued in U.S. Appl. No. 11/193,976", dated Jan. 12, 2009, 6 Pages.
"Non Final Office Action Issued in U.S. Appl. No. 11/425,967", dated Apr. 21, 2010, 8 Pages.
"Non-Final Office Action Issued in U.S. Appl. No. 11/425,967", dated Dec. 6, 2010, 8 pages.
"Final Office Action Issued in U.S. Appl. No. 11/735,674", dated Apr. 5, 2011, 18 pages.
"Non Final Office Action Issued in U.S. Appl. No. 11/735,674", dated Oct. 27, 2010, 20 Pages.
"Non-Final Office Action Issued in U.S. Appl. No. 11/770,713", dated Nov. 4, 2011, 13 Pages.
"Non-Final Office Action Issued in U.S. Appl. No. 11/770,713", dated Oct. 3, 2012, 11 Pages.
"Non Final Office Action Issued in U.S. Appl. No. 11/771,786", dated Jun. 6, 2012, 8 Pages.
"Final Office Action Issued in U.S. Appl. No. 11/771,802", dated May 20, 2011, 26 Pages.
"Non Final Office Action Issued in U.S. Appl. No. 11/771,802", dated Nov. 9, 2010, 25 Pages.
"Non-Final Office Action Issued in U.S. Appl. No. 11/824,412", dated Feb. 9, 2012, 7 Pages.
"Non Final Office Action Issued in U.S. Appl. No. 11/953,764", dated Jan. 19, 2012, 6 Pages.
"Notice of Allowance Issued in U.S. Appl. No. 12/163,451", dated Jan. 27, 2012, 9 Pages.
"Non-Final Office Action Issued in U.S. Appl. No. 12/190,585", dated Feb. 24, 2012, 11 Pages.
"Notice of Allowance Issued in U.S. Appl. No. 12/190,585", dateed Jul. 16, 2012, 9 Pages.
"Non-Final Office Action Issued in U.S. Appl. No. 12/191,270", dated Apr. 28, 2011, 17 pages.
"Notice of Allowance Issued in U.S. Appl. No. 12/191,270", dated Sep. 21, 2011, 10 pages.
"Notice of Allowance Issued in U.S. Appl. No. 13/168,656", dated Mar. 6, 2014, 6 Pages.
"Non Final Office Action Issued in U.S. Appl. No. 13/221,640", dated Nov. 3, 2011, 12 Pages.

"Non-Final Office Action Issued in U.S. Appl. No. 13/546,153", dated Oct. 18, 2012, 12 Pages.
"Non-Final Office Action Issued in U.S. Appl. No. 13/644,866", dated Apr. 16, 2013, 8 Pages.
"Final Office Action Issued in U.S. Appl. No. 13/681,075", dated Feb. 24, 2015, 5 Pages.
"Second Written Opinion Issued in PCT Application No. PCT/US2016/068612", dated Nov. 15, 2017, 5 Pages.
Rick, et al., "Integration of Automatic Microphone Selection With Acoustic Echo Cancellation", Retrieved From: http://www.aes.org/e-lib/browse.cfm?elib=10220, Oct. 1996, 1 Page.
Rui, et al., "Sound Source Localization for Circular Arrays of Directional Microphones", In Proceedings of IEEE International Conference on Acoustics, Speech, and Signal Processing, Mar. 23, 2005, 4 Pages.
Rui, et al., "Viewing Meetings Captured by an Omni-Directional Camera", In Proceedings of the SIGCHI Conference on Human Factors in Computing Systems, Mar. 31, 2001, 8 Pages.
Schapire, Robert E., "The Boosting Approach to Machine Learning: An overview", In Proceedings of MSRI Workshop on Nonlinear Estimation and Classification, Dec. 19, 2001, pp. 1-23.
Szeliski, et al., "Creating Full View Panoramic Image Mosaics and Environment Maps", In Proceedings of the 24th Annual Conference on Computer graphics and Interactive Techniques, Aug. 3, 1997, 8 Pages.
Tapia, et al., "Concept and Partial Prototype Video: Ubiquitous Video Communication With the Perception of Eye contact", Retrieved From: http://www.ccs.neu.edu/home/intille/papers-files/TapiaIntilleRebulaStoddard03.pdf, Jan. 2003, 2 Pages.
Valin, et al., "Robust Sound Source Localization Using a Microphone Array on a Mobile Robot", In Proceedings of International Conference on Intelligent Robots and Systems, vol. 2, Oct. 27, 2003, 6 Pages.
Vaseghi, Saeed V., "Echo Cancellation", In Book Advanced Signal Processing and Digital Noise Reduction, Jan. 2000, pp. 1-20.
Viola, et al., "Fast and Robust Classification Using Asymmetric AdaBoost and a Detector Cascade", In Proceedings of the 14th International Conference on Neural Information Processing Systems: Natural and Synthetic, Dec. 3, 2001, 8 Pages.
Viola, et al., "Multiple Instance Boosting for Object Detection", In Proceedings of Advances in Neural Information Processing Systems, Jan. 2006, 8 Pages.
Viola, et al., "Robust Real-Time Face Detection", In Proceedings of International Journal of computer vision, vol. 57, Issue 2, May 1, 2004, pp. 137-154.
Wang, et al., "Voice Source Localization for Automatic Camera Pointing System in Videoconferencing", In Proceedings of the IEEE International Conference on Acoustics, Speech, and Signal Processing, vol. 1, Apr. 22, 1997, pp. 187-190.
Wark, et al., "The Use of Temporal Speech and Lip Information for Multi-Modal Speaker Identification Via Multi-Stream HMM's", In Proceedings of IEEE International Conference on Acoustics, Speech, and Signal Processing, Jun. 5, 2000, pp. 2389-2392.
Wilson, et al., "Combining Multiple Depth Cameras and Projectors for Interactions on, Above, and Between Surfaces", In Proceedings of the 23rd Annual ACM Symposium on User Interface Software and Technology, Oct. 3, 2010, pp. 273-282.
Yokoe, et al., "Audio-Based Estimation of Speakers Directions for Multimedia Meeting Logs", In Proceedings of 2007 IEEE International Conference on Multimedia and Expo, Jul. 2, 2007, pp. 212-215.
Yoshimi, Billibon H., "A Multimodal Speaker Detection and Tracking System for Teleconferencing", In Proceedings of the Tenth ACM International Conference on Multimedia, Dec. 1, 2002, pp. 427-428.
Zhang, et al., "Boosting-Based Multimodal Speaker Detection for Distributed Meetings", In Proceedings of IEEE Eighth Workshop on Multimedia Signal Processing, Oct. 3, 2006, 6 Pages.
Zhang, et al., "Maximum Likelihood Sound Source Localization for Multiple Directional Microphones", In Proceedings of 2007 IEEE International Conference on Acoustics, Speech and Signal Processing, Apr. 15, 2007, 4 Pages.

(56) References Cited

OTHER PUBLICATIONS

"Non-Final Office Action Issued in U.S. Appl. No. 13/681,075", dated Jun. 20, 2014, 8 Pages.
"Non-Final Office Action Issued in U.S. Appl. No. 13/681,075", dated Oct. 24, 2014, 7 Pages.
"Notice of Allowance Issued in U.S. Appl. No. 14/991,847", dated Nov. 29, 2016, 11 Pages.
"Ex-parte Quayle Action Issued in U.S. Appl. No. 15/441,793", dated Oct. 20, 2017, 8 Pages.
"First Office Action Issued in Chinese Patent Application No. 200780022873.0", dated Oct. 12, 2010, 7 Pages.
"Third Office Action Issued in Chinese Patent Application No. 200780022873.0", dated May 3, 2012, 6 Pages.
"Notice of Allowance Issued in Japanese Patent Application No. 2010-514923", dated Oct. 19, 2012, 6 Pages.
"Notice of Allowance Issued in Japanese Patent Application No. 2010-514961", dated Jun. 14, 2013, 6 Pages.
"Office Action Issued in Japanese Patent Application No. 2010-514961", dated Jan. 25, 2013, 6 Pages.
"Office Action Issued in Japanese Patent Application No. 2010-514961", dated Aug. 3, 2012, 6 Pages.
"Office Action Issued in Canadian Patent Application No. 2653278", dated Dec. 3, 2013, 3 Pages.
"Office Action Issued in Indian Patent Application No. 6300/CHENP/2008", dated Oct. 21, 2016, 8 Pages.
Asano, et al., "Detection and Separation of Speech Event Using Audio and Video Information Fusion and Its Application to Robust Speech Interface", In EURASIP Journal on Advances in Signal Processing, Dec. 1, 2004, pp. 1727-1738.
Besson, et al., "Information Theoretic Optimization of Audio Features for Multimodal Speaker Detection", In Technical Report No. 08/2005, Feb. 2005, 19 Pages.
Busso, et al., "Smart Room: Participant and Speaker Localization and Identification", In Proceedings of IEEE International Conference on Acoustics, Speech, and Signal Processing, Mar. 18, 2005, 4 Pages.
Capin, et al., "Camera-Based Virtual Environment Interaction on Mobile Devices", In Proceedings of International Symposium on Computer and Information Sciences, Nov. 1, 2006, 9 Pages.
Chang, et al., "Automatic Head-Size Equalization in Panorama Images for Video Conferencing", In Technical Report, MSR-TR-2005-48, May 2005, 42 Pages.
Chaudhari, et al., "Information Fusion and Decision Cascading for Audio-Visual Speaker Recognition Based on Time-Varying Stream Reliability Prediction", In Proceedings of International Conference on Multimedia and Expo, Jul. 6, 2003, pp. 9-12.
Cutler, et al., "Distributed Meetings: A Meeting Capture and Broadcasting System", In Proceedings of the Tenth ACM International Conference on Multimedia, Dec. 1, 2002, pp. 503-512.
Eneman, et al., "Real-Time Implementation of an Acoustic Echo Canceller", In Proceedings of the COST#254, Workshop on Intelligent Communications, Jun. 4, 1998, 7 Pages.
Gaspar, et al., "New Depth from Focus Method for 3D PTZ Camera Target Tracking", Retrieved From: http://www.dem.ist.utl.pt/poliveira/Courses/dsfps0910/docs/prts/DSFPS2010%20-%20DFF%20-%20TG.pdf, Retrieved on: Apr. 4, 2011, 4 Pages.
Green, et al., "Panocam: Combining Panoramic Video with Acoustic Beamforming for Videoconferencing", In Proceedings of the Canadian Acoustic Association Conference, Oct. 6, 2004, 3 pages.
Hampapur, et al., "Face Cataloger: Multi-Scale Imaging for Relating Identity to Location", In Proceedings of the IEEE Conference on Advanced Video and Signal Based Surveillance, Jul. 21, 2003, 8 Pages.
He, et al., "Exploring Benefits of Non-Linear Time Compression", In Proceedings of the Ninth ACM International Conference on Multimedia, Sep. 30, 2001, pp. 382-391.
He, Li-Wei, "Why Take Notes, Use the Whiteboard Capture System", In Microsoft Technical Report, MSR-TR-2002-89, Sep. 1, 2002, 11 Pages.

Hu, et al., "Principal Axis-Based Correspondence Between Multiple Cameras for People Tracking", In Proceedings of IEEE Transactions on Pattern Analysis and Machine Intelligence vol. 28, Issue 4, Apr. 2006, pp. 663-671.
Hughes, et al., "The DICE Multi-Site Satellite Videoconference System", Retrieved From: http://www.esaint/esapub/bulletin/bullet80/hughe80.htm, Retrieved on: Nov. 5, 2007, 7 Pages.
Jiang, et al., "Adaptive Noise Reduction of Speech Signals", In Microsoft Technical Report, MSR-TR-2000-86, Jul. 1, 2000, 9 Pages.
Kapralos, et al., "Audio-Visual Localization of Multiple Speakers in a Video Teleconferencing Setting", In International Journal of Imaging Systems and Technology, vol. 13, Issue 1, Jun. 2, 2003, pp. 1-32.
Kozielski, et al., "Online Speaker Recognition for Teleconferencing Systems", In Technical Report, Technical University of Munich, Apr. 14, 2014, 67 Pages.
Lathoud, et al., "AV16.3: An Audio-Visual Corpus for Speaker Localization and Tracking", In International Workshop on Machine Learning for Multimodal Interaction, Jun. 21, 2004, pp. 182-195.
Li, et al "Learning to Detect Multi-View Faces in Real-Time", In Proceedings of 2nd International Conference on Development and Learning, Jun. 12, 2002, pp. 1-6.
Lindstrom, et al., "A Hybrid Acoustic Echo Canceller and Suppressor", In Journal of Signal Processing, vol. 87, Issue 4, Apr. 1, 2007, pp. 739-749.
Lindstrom, "Improving the Performance of a Low-Complexity Doubletalk Detector by a Subband Approach", In Proceedings of International Conference on Systems, Signals and Devices, Mar. 21, 2005, 5 Pages.
Liu, et al. "Automating Camera Management for Lecture Room Environments", In Proceedings of the SIGCHI Conference on Human Factors in Computing Systems, Mar. 31, 2001, 8 Pages.
Liu, et al., "FLYSPEC: A Multi-User Video Camera System With Hybrid Human and Automatic Control", In Proceedings of the Tenth ACM International Conference on Multimedia., Dec. 1, 2002, pp. 484-492.
Mansoori, et al., "Solving Infinite-Horizon Optimal Control Problems Using Haar Wavelet Collocation Method", In Journal of the Australian & New Zealand Industrial & Applied Mathematics, Mar. 18, 2014, pp. 1-5.
Marti, et al., "Real Time Speaker Localization and Detection System for Camera Steering in Multiparticipant Videoconferencing Environments", In IEEE International Conference on Acoustics, Speech and Signal Processing, May 27, 2011, pp. 2592-2595.
MEIR, et al., "An Introduction to Boosting and Leveraging", In Proceedings of Advanced Lectures on Machine Learning, Jan. 1, 2003, pp. 118-183.
Minotto, et al., "Simultaneous-Speaker Voice Activity Detection and Localization Using Mid-Fusion of SVM and HMMs", In Proceedings of IEEE Transactions on Multimedia, vol. 16, Issue 4,, Jun. 2014, pp. 1032-1044.
Mondal, et al., "SureCall: Towards Glitch-Free Real-Time AudioNideo Conferencing", In Proceedings of 18th International Workshop on Quality of Service, Jun. 16, 2010, 9 Pages.
Nanda, et al., "Practical Calibrations for a Real-Time Digital Omnidirectional Camera", In Proceedings of Computer Vision and Pattern Recognition Technical Sketches, vol. 20, Dec. 2001, pp. 1-4.
Nguyen, et al., "More Than Face-To-Face Empathy Effects of Video Framing", In Proceedings of the SIGCHI Conference on Human Factors in Computing Systems, Apr. 6, 2009, pp. 423-432.
Oh, et al., "The ubiTV Application for a Family in ubiHome", In Proceedings of 2nd Ubiquitous Home Workshop, Dec. 6, 2005, 10 Pages.
Pavlovic, et al., "Multimodal Speaker Detection Using Error Feedback Dynamic Bayesian Networks", In Proceedings IEEE Conference on Computer Vision and Pattern Recognition, Jun. 15, 2000, 8 Pages.
"International Search Report and Written Opinion Issued in PCT Application No. PCT/US2007/003715", dated Jan. 31, 2008, 12 Pages.

(56) References Cited

OTHER PUBLICATIONS

"International Search Report and Written Opinion Issued in PCT Application No. PCT/US2008/065579", dated Jan. 6, 2009, 10 Pages.
"International Search Report and Written Opinion Issued in PCT Application No. PCT/US2008/067035", dated Oct. 29, 2008, 10 Pages.
"International Preliminary Report on Patentability Issued in PCT Application No. PCT/US2016/068612", dated Mar. 21, 2018, 7 Pages.
"International Search Report and Written Opinion Issued in PCT Application No. PCT/US2016/068612", dated Mar. 16, 2017, 13 Pages.
"Office Action and Search Report Issued in Chinese Patent Application No. 201680070404.5", dated Oct. 29, 2019, 17 Pages.
Cooperstock, Jeremy R.., "Multimodal Telepresence Systems", In Proceedings of IEEE Signal Processing Magazine vol. 28 , Issue: 1, Jan. 1, 2011, pp. 77-86.
"International Search Report and Written Opinion Issued in PCT Application No. PCT/US2019/032328", dated Aug. 5, 2019, 15 Pages.
"Office Action Issued in European Patent Application No. 16826846.4", dated Aug. 20, 2019, 6 Pages.
Jiang, et al., "A Simple Microphone Array for Source Direction and Distance Estimation", In Proceedings of 6th IEEE Conference on Industrial Electronics and Applications, Jun. 21, 2011, 4 Pages.
"Summon to Attend Oral Proceedings Issued in European Patent Application No. 16826846.4", dated Apr. 3, 2020, 10 Pages.
"Office Action and Search Report Issued in Chinese Patent Application No. 201680070404.5", dated May 26, 2020, 18 Pages.
"Industrial Robot", Published by Southwest Jiaotong University, Jan. 31, 2011, 16 Pages.
"Third Office Action Issued in Chinese Patent Application No. 201680070404.5", dated Nov. 4, 2020, 10 Pages.

\* cited by examiner

VIDEOCONFERENCING DEVICE AND METHOD

BACKGROUND

The disclosure relates generally to videoconferencing, and more particularly to a videoconferencing device and method for providing more engaging, dynamic and immersive video conferencing experiences.

In a typical videoconference, a local video image and audio are captured by a camera and microphone, respectively. In an attempt to capture a better local video image, the camera is often manually manipulated to zoom in or zoom out to capture a wide view showing all participants and as much of their environment as possible, assuming that such the wide view would be the best for the remote participants. However, the optimal local view may drastically differ from one remote device to another. For example, when displayed on a small display device, the wide local view may not display enough detail in a small display. On the other hand, when the camera is zoomed in to capture a narrow local view, certain areas of the local site that could give relevant context may not be captured at all. Accordingly, there still remain significant areas for new and improved ideas for more effective videoconferencing schemes.

SUMMARY

A first device is disclosed, which is located at a first site and in communication with a second device located at a second site geographically separated from the first site. The first device includes a controller configured to automatically control selection of a view defining an area of the second site selectable to be displayed by the first device, the controller automatically selecting the view based on a display configuration of the first device. The controller is configured to automatically control selection of a sound of the second site to be rendered by the first device, the controller automatically selecting the sound based on the selected view. The first device also includes a display configured to display the selected view of the second site based on a video image of the second site captured by the second device, the display having the display configuration. The first device further includes a speaker configured to render the selected sound of the second site based on an audio of the second site captured by the second device.

In another implementation, a method for operating a first device is disclosed, which is located at a first site and in communication with a second device located at a second site geographically separated from the first site. The method includes automatically selecting, via a controller of the first device, a view defining an area of the second site selectable to be displayed by a display of the first device, based on a display configuration of the remote device; based on a selected view, automatically selecting, via the controller of the first device, a sound of the second site to be rendered by a speaker of the first device; displaying, via the display of the first device, the selected view of the second site based on a video image of the second site captured by the second device; and rendering, via the speaker of the first device, the selected sound of the second site based on an audio of the second site captured by the second device.

In another implementation, a first device is disclosed, which is located at a first site and in communication with a second device located at a second site geographically separated from the first site. The first device includes means for selecting, based on a display configuration of the first device, a view defining an area of the second site selectable to be displayed by the first device; means for selecting, based on the selected view, a sound of the second site; means for displaying the selected view of the second site based on a video image of the second site captured by the second device; and means for rendering the selected sound of the second site based on an audio of the second site captured by the second device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

This description is directed to a videoconferencing device and a method for operating the same to provide more engaging, dynamic and immersive videoconferencing experiences. The videoconferencing device may be a remote device that receives a video image and audio from a near end device. The remote device may have a complete control over selecting how the near end site should be displayed at the remote device, which is referred to as a view selection. The "view" may define an area of the near end site that is selectable to be displayed by the remote device. The remote device may also have a complete control over selecting how a sound of the near end site should be rendered by the remote device, which is referred to as a sound selection. For example, the remote device may automatically control the view selection based on its own display configuration. Hence, the view of the near end site displayed by the remote device may be optimized for the display of the remote device, providing visually improved videoconferencing experiences. Also, the remote device may automatically control the sound selection based on the selected view to provide more immersive videoconferencing experiences. Further, the remote device may be configured to periodically check if a new view and sound selection is necessary and, if necessary, select and switch to the new view and sound.

Figure 1:
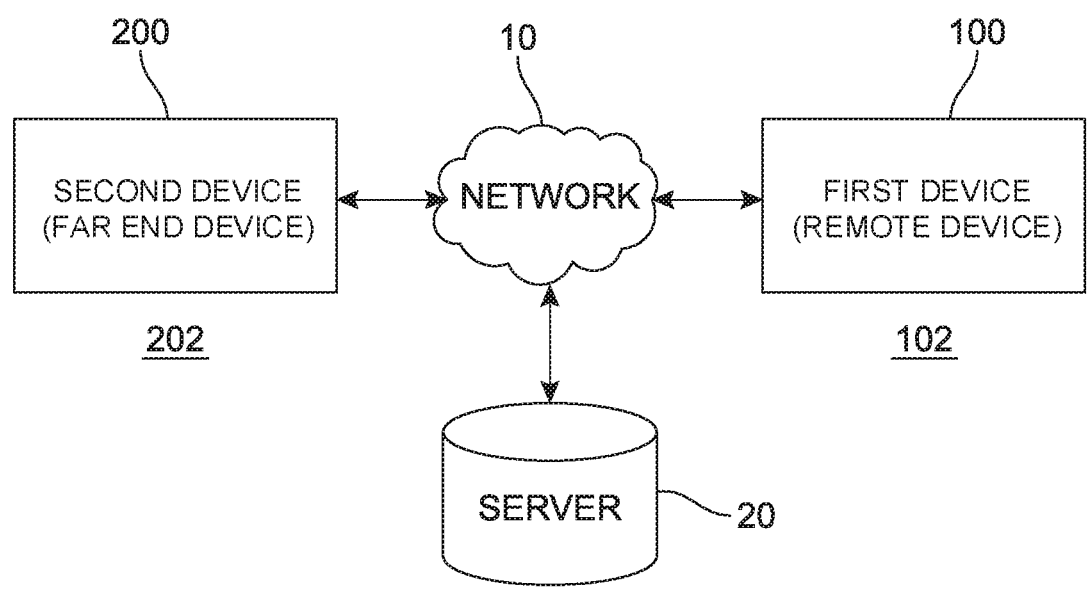
FIG. 1 illustrates exemplary remote and near end devices located at remote and near end sites, respectively, and connected to each other via a network.

FIG. 1 illustrates exemplary first and second devices 100, 200 located at first and second sites 102, 202, respectively, and connected to each other via a network 10. For easier understanding of the disclosure, the first device 100 is referred to as a remote device and the second device 200 is referred to as a near end device. As will be apparent from the description below, the terms "remote" and "near end" are arbitrarily used to solely indicate the geographical separation and hence may be used interchangeably. The first and second sites 102, 202 are also referred to as remote and near end sites, respectively. The near end device 200 may be configured for videoconferencing or multicasting. The near end device 200 may be configured and operating to capture both near end video image and audio at the near end site 202. The near end device 200 may then output near end video data 206 and near end audio data 208 (shown in FIG. 3). The near end video data 206 may include the near end video image captured by the near end device 200. The near end audio data 208 may include the near end audio captured by the near end device 200.

The near end device 200 may be a single-unit device having one or more cameras and one or more microphones to capture and process the near end video image and audio. For example, the near end device 200 may be a videoconference device equipped with one or more cameras and one or more microphones to capture the near end video image and audio. Alternatively, the near end device 200 may be a combination of separate units configured to capture and process the near end video image and audio. For example, the near end device 200 may include a plurality of cameras and microphones and a console in a multicasting studio. Implementations of the near end device 200 are not limited to the particular examples described in this disclosure.

The remote device 100 may be configured to receive the near end video and audio data 206, 208 and display and render the selected view and sound of the near end site 202 based on the received near end video and audio data 206, 208. As described above, the remote device 100 may have a complete control over the view selection and sound selection. For example, the remote device 100 may be configured to automatically select a view of the near end site 202 to be displayed by the remote device 100. The remote device 100 may also automatically select a sound of the near end site 202 to be rendered by the remote device 100. In an implementation, the view selection by the remote device 100 may be automatically controlled based on a display configuration of the remote device 100, such as a display size or resolution of the remote device 100. The sound selection may also be automatically controlled by the remote device 100 based on the selected view. The remote device 100 may also be configured to automatically select a new view and sound, when necessary.

The remote and near end devices 100, 200 may be connected directly to each other via the network 10. Alternatively, an additional device, such as a cloud server 20 connected to the network 10, may be used to administrate and/or mediate the connections and communications between the remote and near end devices 100, 200. The cloud server 20 may be operated by, for example, a videoconferencing service provider, multicasting studio or the like, to enable secure videoconferencing or multicasting to various remote devices 100 of different configurations and capabilities. For example, when the near end device 200 is used to multicast an event occurring at the near end site 202, the cloud server 20 may exclusively receive the near end video and audio data 206, 208 from the near end device 200 and provide the received near end video and audio data 206, 208 to a number of remote devices 100 via the network 10.

Figure 2A:
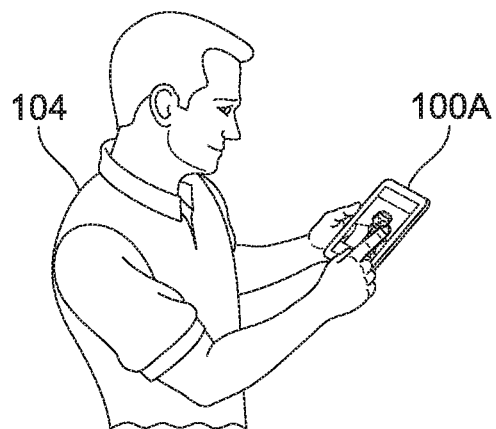
FIGS. 2A, 2B, 2C and 2D illustrate various exemplary implementations of the remote device.
Figure 2B:
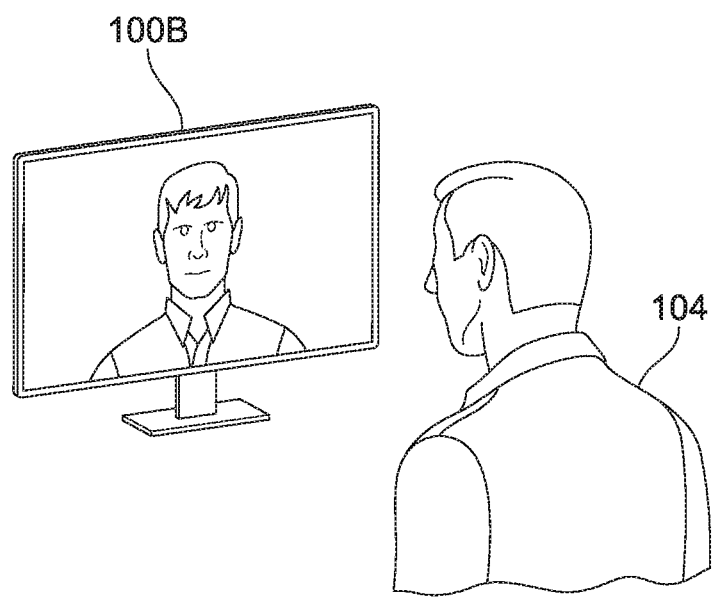
Figure 2C:
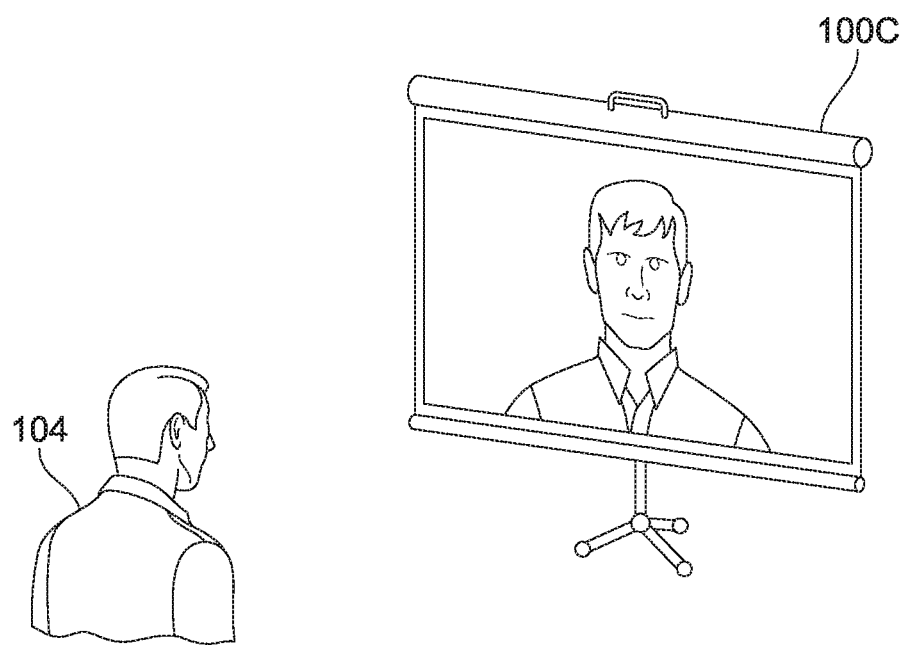
Figure 2D:
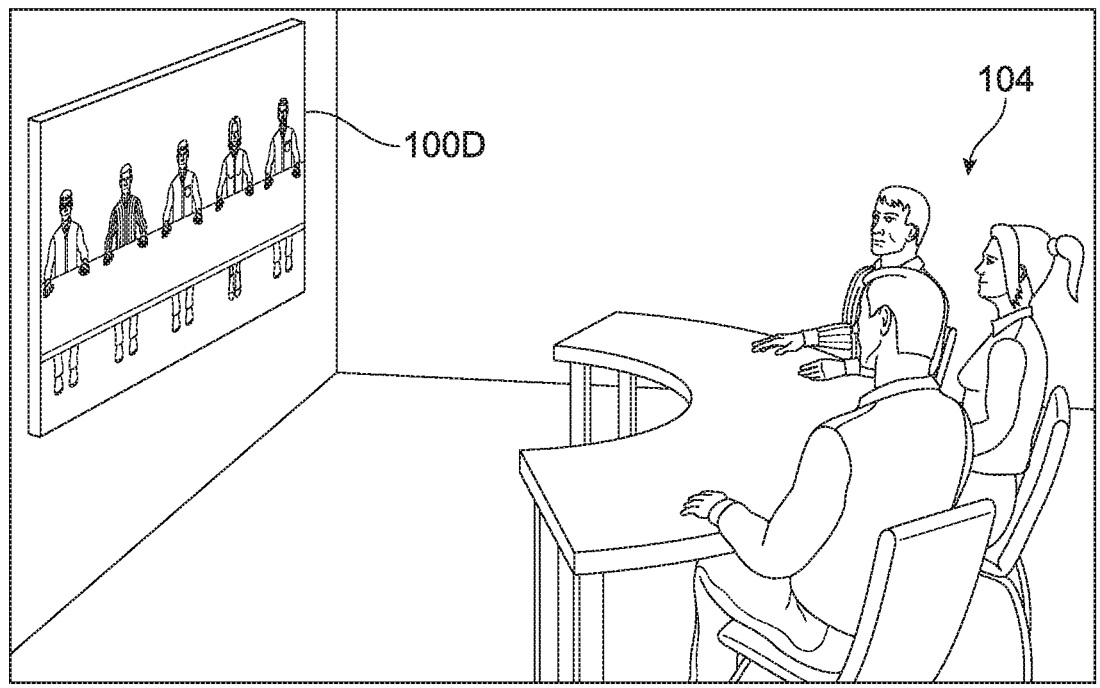

FIGS. 2A, 2B, 2C and 2D illustrate various exemplary implementations of the remote device 100. FIG. 2A illustrates the remote device 100 implemented as a mobile device 100A, such as a mobile phone or tablet, which typically has a display size of less than 12 inches. The mobile device 100A may be a laptop computer having a display size ranging between 12 inches to 17 inches. FIG. 2B illustrates the remote device 100 implemented as a desktop computer, all-in-one computer, or small to medium-sized television 100B, of which a typical display size ranges between 20 inches and 50 inches. FIG. 2C illustrates the remote device 100 implemented as a projection device or large-sized television 100C, of which a typical display size ranges between 50 inches to 100 inches. FIG. 2D illustrates the remote device 100 implemented as a large format display 100D, such as a movie screen or multiple display wall, which typically has a display size greater than 100 inches. Other implementations are also contemplated, such as an augmented reality (AR) or virtual reality (VR) device, a wearable display, and the like.

As illustrated in FIGS. 2A, 2B, 2C and 2D, each remote device 100 may have a different display size and resolutions. Some remote devices 100 may have the same display size but different resolutions. Some remote devices 100 may have different display sizes but the same resolution. Also, depending on a distance of the remote user 104 from the remote device 100, the display size of the remote device 100 may be perceived differently by the remote user 104. For example, when viewed from several inches away, a near end view displayed in a high definition (HD) resolution on the mobile phone 100A (shown in FIG. 2A) may be seen as sufficiently large and clear by the remote user 104. However, when viewed from several feet away from the mobile phone 100A, the same near end view may be too small for the remote user 104.

In some instances, the actual size and/or resolution of the near end video image displayed on the remote device 100 may be different from the display size and resolution of the remote device 100. For example, the remote user 104 may run a videoconferencing application that opens a window (shown in FIG. 10A) on the display of the remote device 100 to show the near end video image. The size of the window may be adjusted by the remote user 104. For example, depending on the display size, distance of the remote user 104 from the remote device 100, bandwidth/connection conditions or the like, the remote user 104 may adjust the size of the window to be substantially smaller than the display of the remote device 100. Hence, the actual display size and resolution for displaying the near end video image may differ from the display size and resolution of the remote device 100.

Due to the actual display size and/or resolution differences among the different remote devices 100, different distances of the remote users 104 from the remote devices 100, different bandwidth/connection conditions and/or the like, the same near end video image may be displayed drastically different on different remote devices 100. For example, the near end device 200 may capture and process the near end video image to provide a full view 310 (shown in FIG. 5) of the near end site 202. When the full view 310 is displayed on the large format display 100D illustrated in FIG. 2D, the details of the near end video image may be clearly visible to the remote users 104. However, when the same full view 310 is displayed on the remote device 100 having a small display, such as the mobile phone or tablet 100A illustrated in FIG. 2A, the details of the near end video image may not be sufficiently visible, and the remote user 104 may not be able to promptly and accurately identify the active speaker and the facial expressions and body languages of near end subject 204 (shown in FIG. 4).

Figure 5:
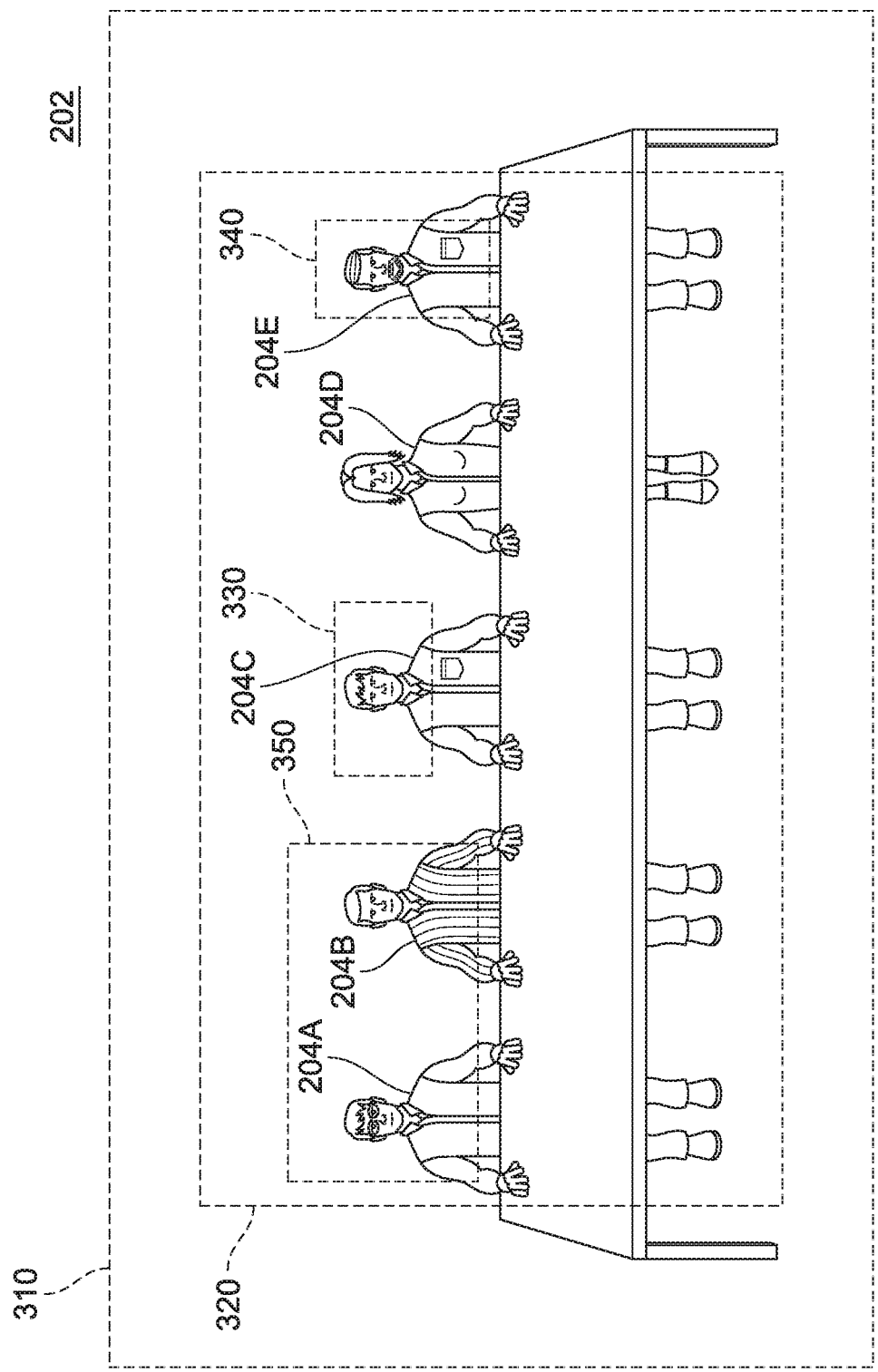
FIG. 5 illustrates exemplary views of the near end site that may be selectable by a controller of the remote device to be displayed on a display of the remote device.

The near end device 200 may capture and process the near end video image to provide a narrow view 330 illustrated in FIG. 5, to prominently display an active speaker among the remote subjects 204. The narrow view 330 displayed on the remote device 100 having a smaller screen, such as the mobile phone or tablet 100A illustrated in FIG. 2A, may help the remote user 104 identify detailed facial expressions of the active speaker. However, when the narrow view 330 of the active speaker is displayed on the large format display 100D illustrated in FIG. 2D, the active speaker displayed one the remote device 100 may become excessively large and unnecessary visual details of the active speaker may become visible, which may distract the remote user 104 from concentrating on and actively participating in the videoconference.

Furthermore, when the near end audio captured at the near end site 202 is not matched with a view of the near end video image displayed on the remote device 100, the remote user 104 may become confused. For example, a narrow view prominently showing a head of an active speaker is displayed on the remote device 100 and the sound of the active speaker rendered by the remote device 100 is mixed with voices from other near end subjects 204 not shown in the narrow view, the remote user 104 may become confused as to which voice originates form the active speaker. Also, when two or more near end subjects 204 speak simultaneously and the sound of the each near end subject 204 speaking simultaneously is not aligned with a position of each near end subject 204 displayed on the remote device 100, the remote user 104 may feel disoriented and even nauseated.

According to the disclosure, each remote device 100 may be configured to have a complete control over the view and sound selection. As described above, the view selection refers to how the near end site 202 should be displayed by the remote device 100, and the sound selection refers to how the sound of the near end site 202 should be rendered by the remote device 100. For example, the remote device 100 may be configured to automatically select a view of the near end site 202 to be displayed by the remote device 100. The view may be defined as an area of the near end site 202 that is selectable to be displayed by the remote device 100. Also, the remote device 100 may be configured to automatically select a sound of the near end site 202 to be rendered by the remote device 100. In an implementation, the remote device 100 may automatically control the view selection based on its display configuration, such as display size and resolution, to select the view optimized for the display configuration. The remote device 100 may automatically control the sound selection based on the selected view such that selected sound matches the selected view.

The remote device 100 may also be configured to automatically switch the view and sound when an event occurs at the near end site 202 that requires a new view and sound for the remote device 100. For example, when one of the near end subjects 204 becomes an active speaker, the remote device 100 may switch the view from the full view 310 to the narrow view 330 to prominently display the active speaker. The near end audio may also be rendered to switch from a full auditory sound to a narrow beam sound focusing on the voice of the active speaker. When the active speaker stops speaking and none of the remaining near end subjects 204 speak, the remote device 100 may switch back to the full view 310. The sound of the near end audio may also be switched back to the full auditory sound.

Figure 3:
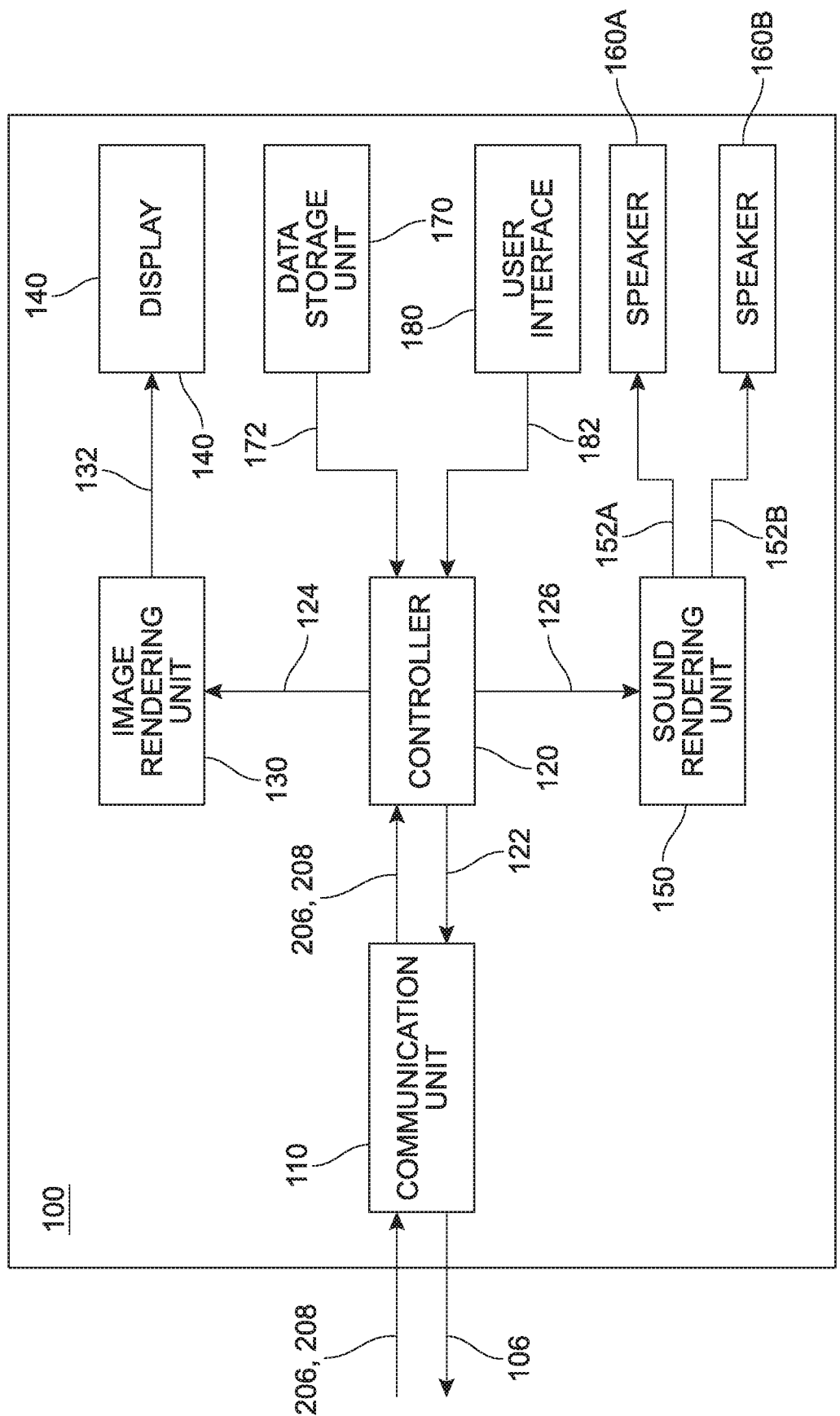
FIG. 3 illustrates an exemplary configuration of the remote device.

FIG. 3 illustrates an exemplary configuration of the remote device 100. The remote device 100 may include a communications unit 110, a controller 120, an image rendering unit 130, a display 140, a sound rendering unit 150, one or more speakers 160A, 160B, a data storage unit 170 and a user interface 180. As described above, the remote device 100 may be implemented in many different configurations and hence should not be limited to the implementations descried and illustrated herein.

The communications unit 110 may be configured to establish communications between the remote device 100 and the near end device 100 via the network 10. The communications unit 100 may also establish communication between the remote device 100 and the cloud server 20 (illustrated in FIG. 1) via the network 10. The communications unit 100 may receive the near end video and audio data 206, 208 directly from the near end device 200 or via the cloud server 20. The near end video data 206 may contain the near end video image captured by the near end device 200. The near end audio data 208 may contain the near end audio captured by the near end device 200.

The controller 120 may receive display configuration information, such as the display size and resolution. For example, the display configuration information may be stored in the data storage unit 170, and the controller 120 may be connected to the data storage unit 170 to retrieve the display configuration information 172. The controller 120 may be connected to the user interface 180, such as a keyboard, mouse, touch screen, remote control, switches, buttons and the like, to receive a user input 182 from the remote user 104. The remote user 104 may use the user interface 180 to control the operations of the remote device 100. For example, the remote user 104 may use the user interface 180 to manually select the view and sound to be displayed and rendered by the remote device 100. When the user input 182 for manual view and sound selection is received, the controller 120 may cease to automatically control the view and sound selection.

The controller 120 may have a complete control over selection of a view of the video image captured by the near end device 200 to be displayed at the display 140 of the remote device 100 and a sound of the audio captured by the near end device 200 to be rendered by the speakers 160A, 160B of the remote device 100. The controller 120 may also select the view and sound by itself. Alternatively, the controller 120 and the near end device 200 may share the view and sound selection responsibilities, or the view and sound selection may be carried out by the near end device 200.

Figure 8A:
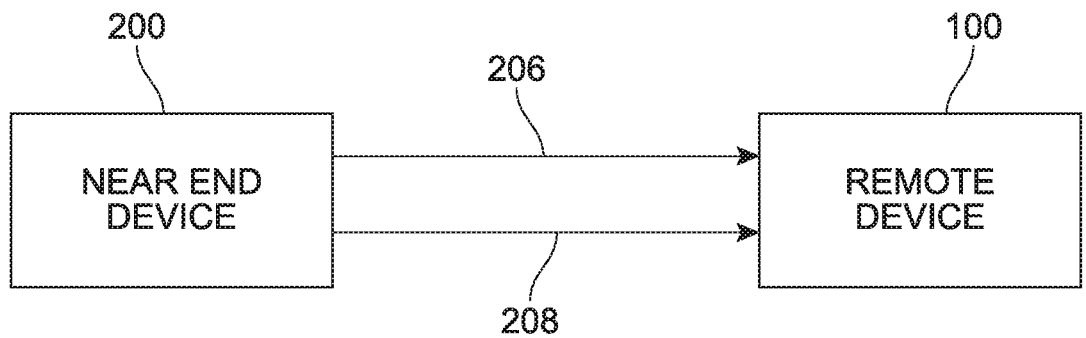
FIGS. 8A, 8B and 8C illustrate various exemplary implementations for the automatic selection control scheme by the remote device.
Figure 8B:
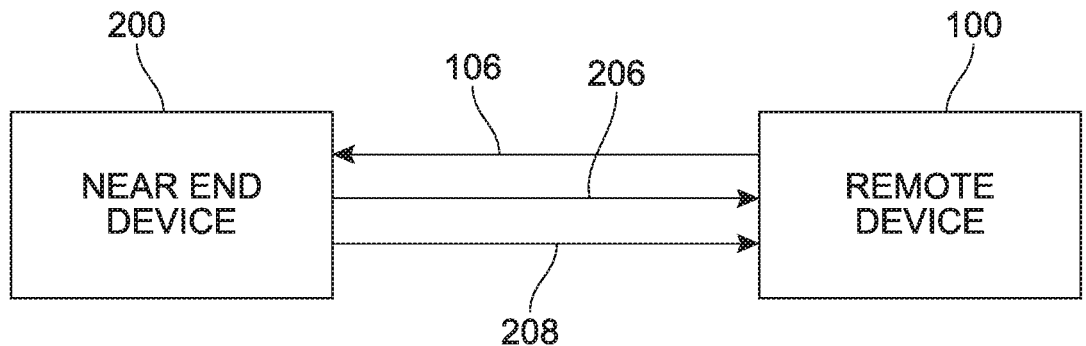
Figure 8C:
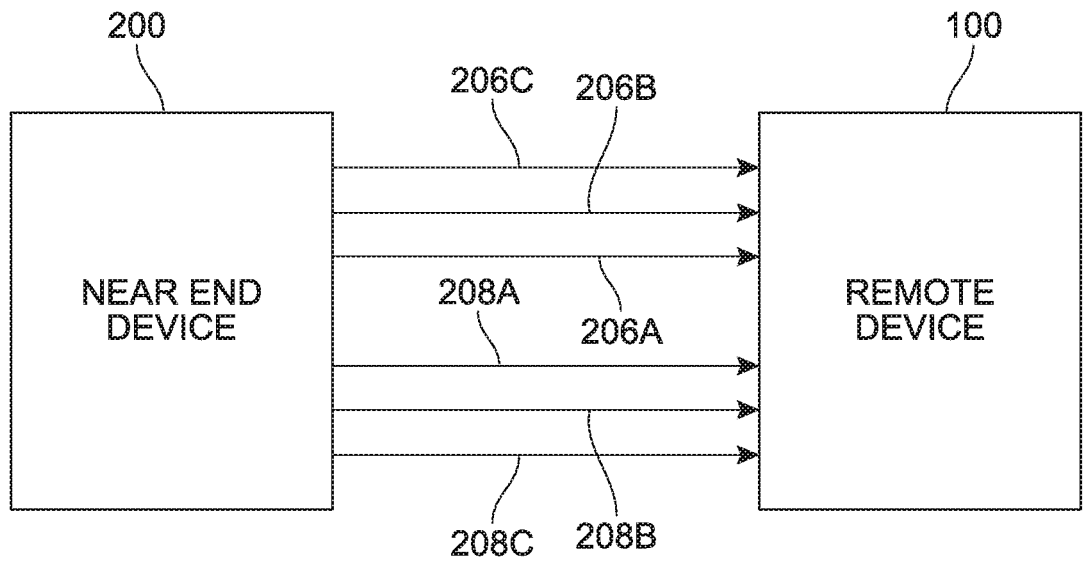

In an implementation, the controller 120 may receive a plurality of near end video images captured by the near end device 200. Each near end video image may be processed by the near end device 200 to have a different view. The controller 120 may then select one of the plurality of near end video images to display the view selected based on the display configuration information. The sound of the near end audio may be selected in the same manner. For example, the controller 120 may receive a plurality of near end audio streams captured by the near end device 200. Each near end audio stream may be processed by the near end device 200 to have a different sound. The controller 120 may then select one of the plurality of near end video images to render the sound to match the selected view. In this implementation, the view and sound selection is carried out by the controller 120 while the processing of the captured near end video image and audio is mostly done locally at the near end device 100. An example of this implementation is shown in FIG. 8C, which is described below in detail.

In another implementation, the controller 120 may receive a near end video image from the near end device 200. The near end video image may contain coordinate data for a plurality of views selectable by the controller 120. The controller 120 may then process the near end video image to generate the view selected based on the display configuration information of the remote device 100. The controller 120 may also receive and process a near end audio captured by the near end device 200 to generate the sound that matches the selected view. In this implementation, the controller 120 may perform both the view and sound selection and the near end video image and audio processing to generate the selected view and sound to be displayed and rendered by the remote device 100. An example of this implementation is shown in FIG. 8A, which is described below in detail.

In yet another implementation, the controller 120 may select a view of the near end video image based on the display configuration information and select a sound of near end audio based on the selected view. The controller 120 may then send a control signal 122 to the near end device 200 to indicate the selected view and sound. In response to the control signal 122, the near end device 200 may send the selected view of the near end video image and the selected sound of the near end audio. An example of this implementation is shown in FIG. 8B, which is described below in detail.

In yet another implementation, the cloud server 20 may be used to administrate and/or mediate the selection of the near end view and sound for the remote device 100. For example, the cloud server 20 may be connected to one or more remote devices 100 to receive the control data 106 indicating the view and sound selected by each remote device 100. As described above, the different remote devices 100 may require and select different views and sounds. The cloud server 20 may then receive a plurality of near end video data streams and audio data streams. Based on the view and sound selected by each remote device 100, the cloud server 20 may select, from the plurality of near end video data streams and audio data streams, a video steam and an audio stream that match the view and sound selected by each remote device 100 and provide the selected video and audio streams to each remote device 100. Alternatively, the cloud server 20 may receive video and audio streams having coordinate information from the near end device 200 and process the video and audio streams to generate the view and sound selected by each remote device 100. The cloud server 20 may then send video and audio streams of the selected view and sound to each remote device 100.

Referring to FIG. 3, the controller 120 may be connected to the communications unit 110 to receive the near end video data 206 and near end audio data 208 therefrom. The controller 120 may be connected to the image rendering unit 130 and sound rendering unit 150. The image rendering unit 130 may be connected to the display 140. The sound rendering unit 150 may be connected to the one or more speakers 160A, 160B. The controller 120 may output a video signal 124 to the image rendering unit 130. The video signal 124 may include the view selected by the controller 120 or the near end device 200 to be displayed on the display 140. The controller 120 may output a sound signal 126 to the sound rendering unit 150. The sound signal 126 may include the sound selected by the controller 120 or the near end device 200 to be rendered by the one or more speakers 160A, 160B.

In another implementation, the controller 120 may output the control signal 122 to the communications unit 110. The control signal 122 may include selection information indicating the view selected to be displayed on the display 150 and the sound selected to be rendered by the speakers 160A, 160B. The control signal 122 may be included in control data 106 output from the communications unit 100 to the near end device 200 or cloud server 20. Based on the selection information in the received control data 106, the near end device 200 or cloud server 20 may select the view and sound of the near end site 202 to the remote device 100.

Figure 4:
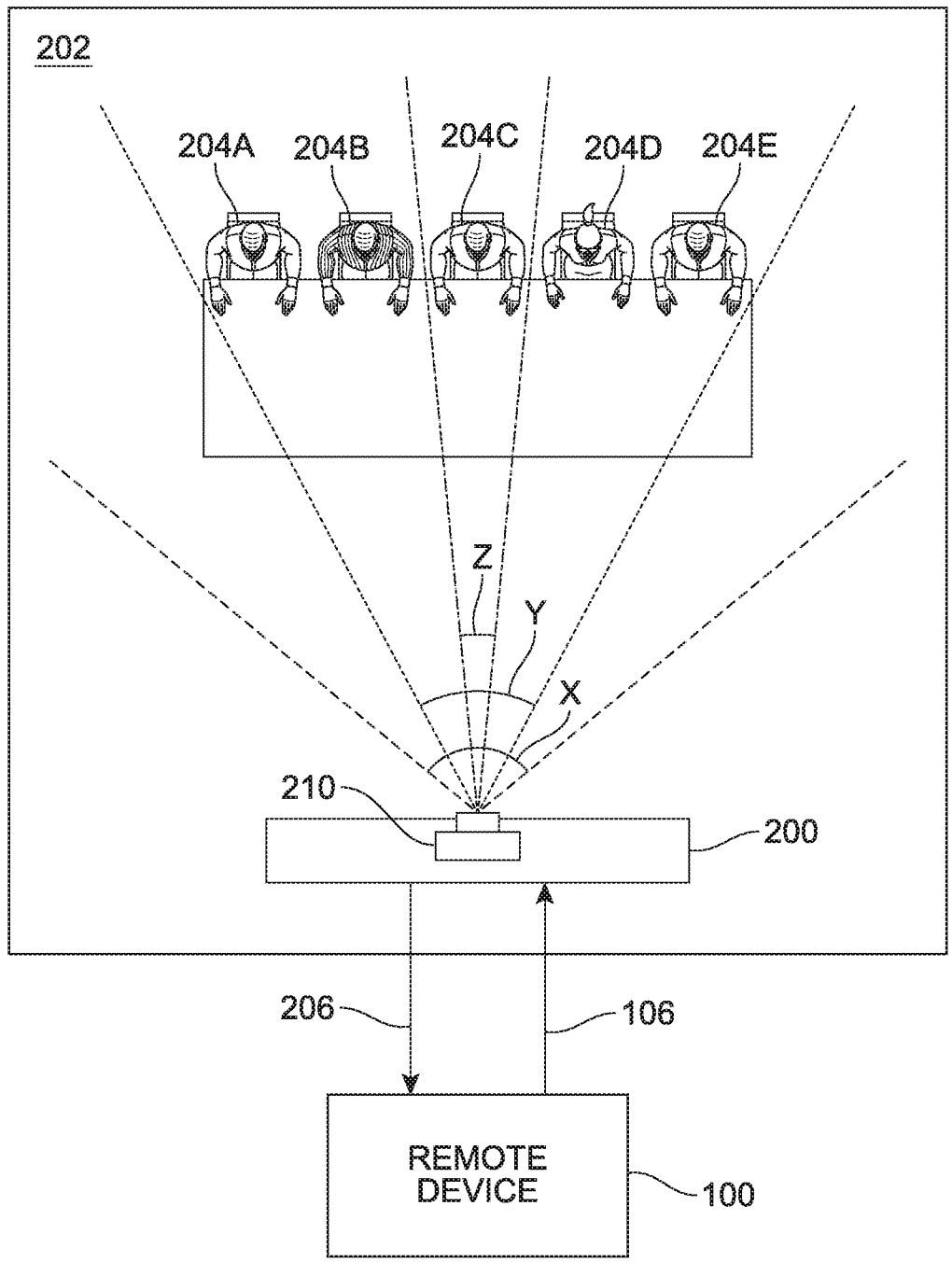
FIG. 4 illustrates an example of the near end device capturing one or more views of the near end site at the near end site.

FIG. 4 illustrates an example of the near end device 200 capturing one or more views of the near end site 202. The near end device 200 may have one or more cameras 210 (only one shown) to capture one or more views of the near end site 202. The near end site 202 may be a room where the near end subjects 204A, 204B, 204C, 204D, 204E (concurrently referred to hereinafter as near end subjects 204) are gathered and facing the one or more cameras 210 for videoconferencing or multicasting. In an implementation, a single camera 210 may be used to capture one or more views of the near end site 202. The camera 210 may be configured to zoom in and out to change the capturing angle, which may in turn change the captured view. The camera 210 may be configured to swivel or tilt to capture a particular near end subjects 204. The camera 210 may be controlled by the control data 106 received from the remote device 100.

In another implementation, the near end device 100 may include a plurality of cameras 210 having different capturing angles, such as wide, medium and narrow capturing angles X, Y and Z, respectively, in order to capture different views, such as full, fit and narrow views, respectively. The cameras 210 having different view angles may simultaneously capture the near end site 202 to generate a plurality of different views of the near end site 202, which may be sent to the remote device 100 for automatic selection by the controller 120. Alternatively, the near end device 200 may receive control data 106 containing the control signal 122 from the controller 120. Based on the control signal 122, the near end device 20 may capture the near end video image in the view indicated by the control signal 122.

FIG. 5 illustrates various exemplary views of the near end site 202 that may be selectable by the controller 120 to be displayed on the display 140 of the remote device 100. The selectable views may include a full view 310, a fit view (e.g., fit views 320, 350) and a narrow view (e.g., narrow views 330, 340), which may be selected based on the display configuration of the remote device 100. As described above, the view may define an area of the near end site 202 that is selectable to be displayed by the remote device 100. The full view 310 may define a substantially entire area of the second site 202. The fit view 320 may define a partial area of the second site 202 that is prominently occupied by all of the near end subjects 204. The narrow view 330 may define another partial area of the near end site 202 that is prominently occupied by the near end subject 204C. For example, when the display is a large display as shown in FIGS. 2C and 2D, the controller 120 may select the full view 310 to capture the near end site 202 as much as possible. However, when the full view 310 is displayed on the mobile phone or tablet 100A shown in FIG. 2A, the remote subjects 310 displayed on the display 140 may be too small. Hence, the controller may avoid selecting the full view 310 for the table 100A and instead may select a fit view or a narrow view.

The controller 120 may select the fit views 320, 350 to more prominently display two or more the near end subjects 204. For example, when the fit view 320 is selected, all of the near end subjects 204 may be displayed to fit the display 140. When two neighboring near end subjects 204A, 204B are speaking to each other, the controller 120 may select the fit view 350 to show the near end subjects 204A, 204B to fit the display 140. In an embodiment, the fit views 320, 350 may be generated by cropping and enlarging a portion of the full view 310, which may be performed by the remote device 100 or the near end device 200. Alternatively, the camera 210 may be rotated, tilted, zoomed in or zoomed out to capture the fit views 320, 350.

The narrow views 330, 340 may be selected to more prominently display a single near end subject 204, which may be an active speaker. For example, the landscape narrow view 330 may be selected to prominently display the near end subject 204C on the computer monitor 100B or the projection device having a landscape display. The portrait narrow view 340 may be selected to prominently display the near end subject 204E on the mobile phone or tablet 100A having a portrait display. When the mobile phone or tablet 100A is operated in a landscape display mode, the controller 120 may select the landscape narrow view 330. Similar to the fit views 320, 350, the narrow views 330, 340 may be generated by cropping and enlarging a portion of the full view 310. Alternatively, the narrow views 330, 340 may be captured by rotating, titling and/or zooming in the camera 210.

Figure 6:
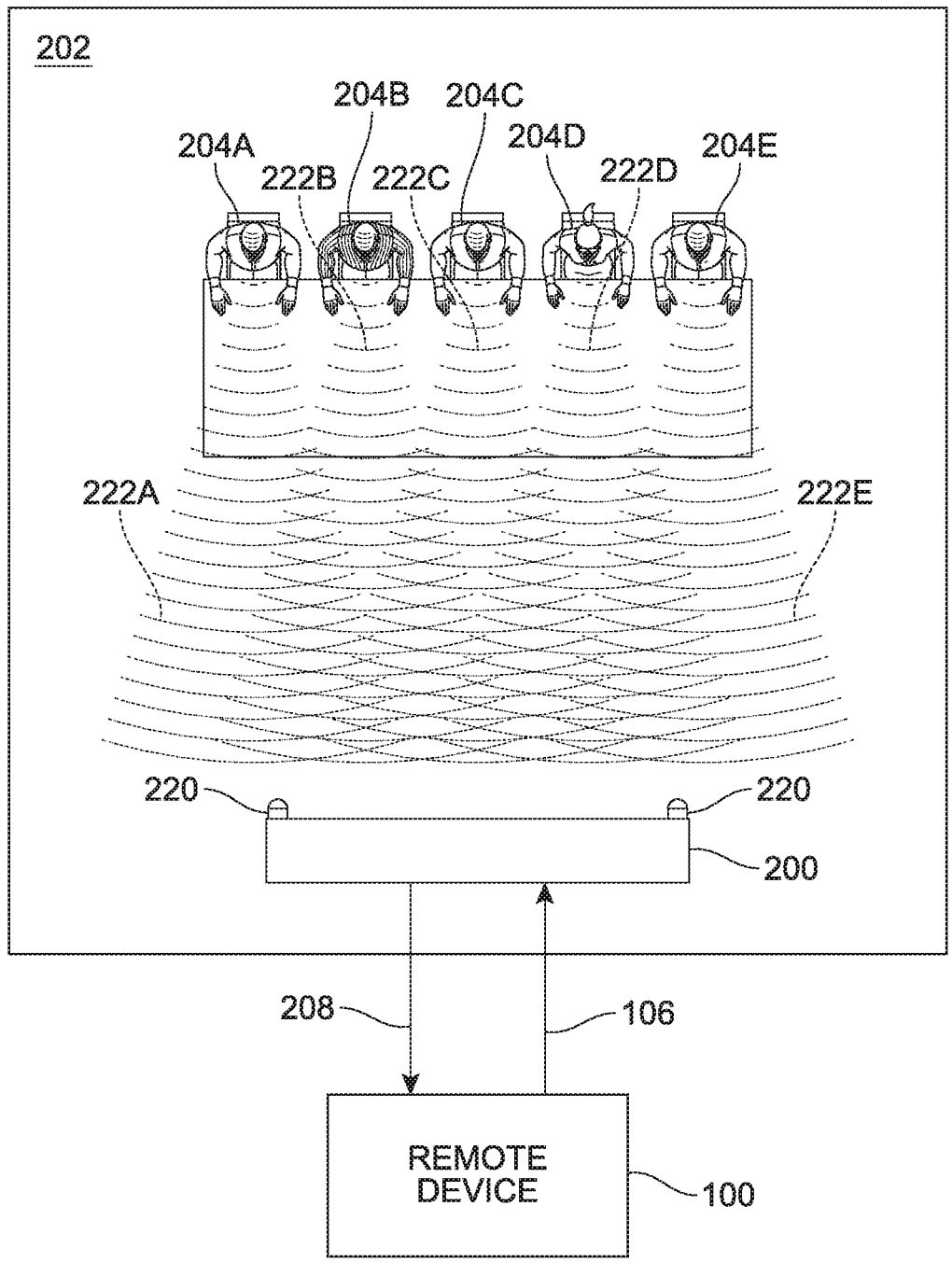
FIG. 6 illustrates an example of the near end device capturing the near end audio at the near end site.

FIG. 6 illustrates an example of the near end device 200 capturing the near end audio at the near end site 202. The near end device 200 may include one or more microphones 220 configured to capture voices 222A, 222B, 222C, 222D, 222E (collectively referred to hereinafter as voices 222) originated from the near end subjects 204A, 204B, 204C, 204D, 204E, respectively. In an implementation, the near end device 200 may capture the auditory scene of the near end site 202 as a spatial audio and transmit the captured spatial audio using a parametric representation, such as a B-format (Ambisonics), or an object-based format, such as Windows Sonic™ or Dolby Atmos™, to allow the remote device 100 to select a width and orientation of the auditory scene. Alternatively, the control data 106 received from the remote device 100 may include sound selection information, and the near end device 200 may process the captured spatial audio to generate the selected sound having a particular width and orientation of the auditory scene at the near end site 202.

Figure 7A:
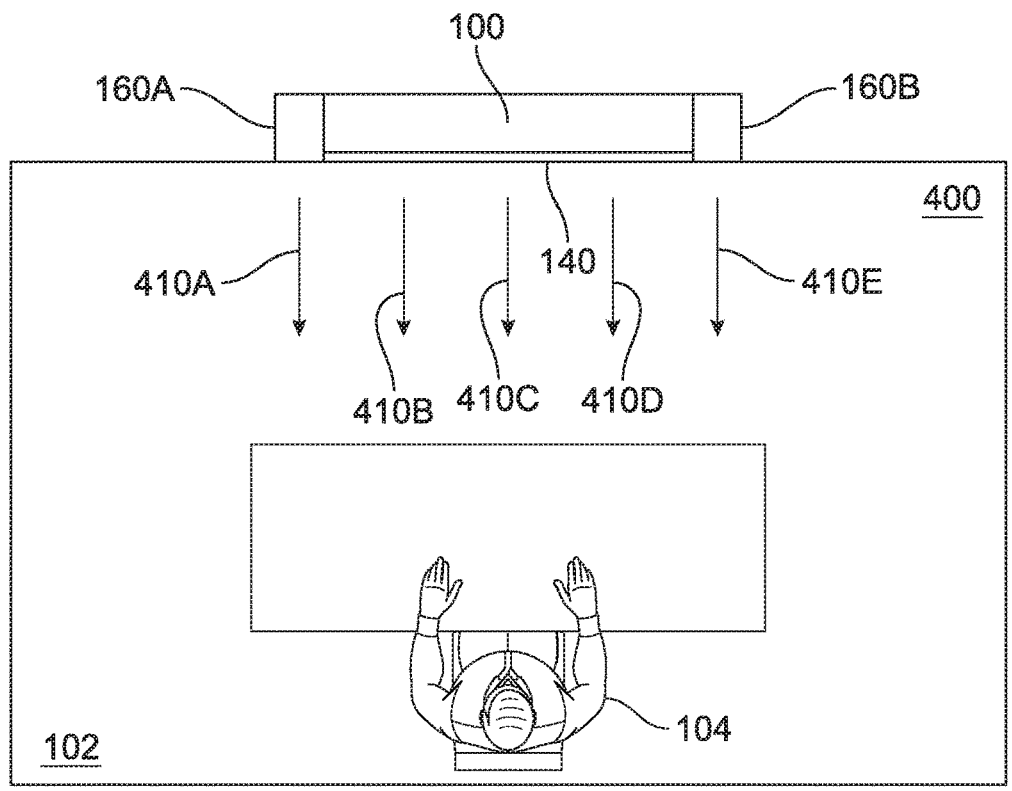
FIGS. 7A and 7B illustrate examples of the remote device selecting and rendering a sound of the near end audio that matches the selected view displayed on the display.
Figure 7B:
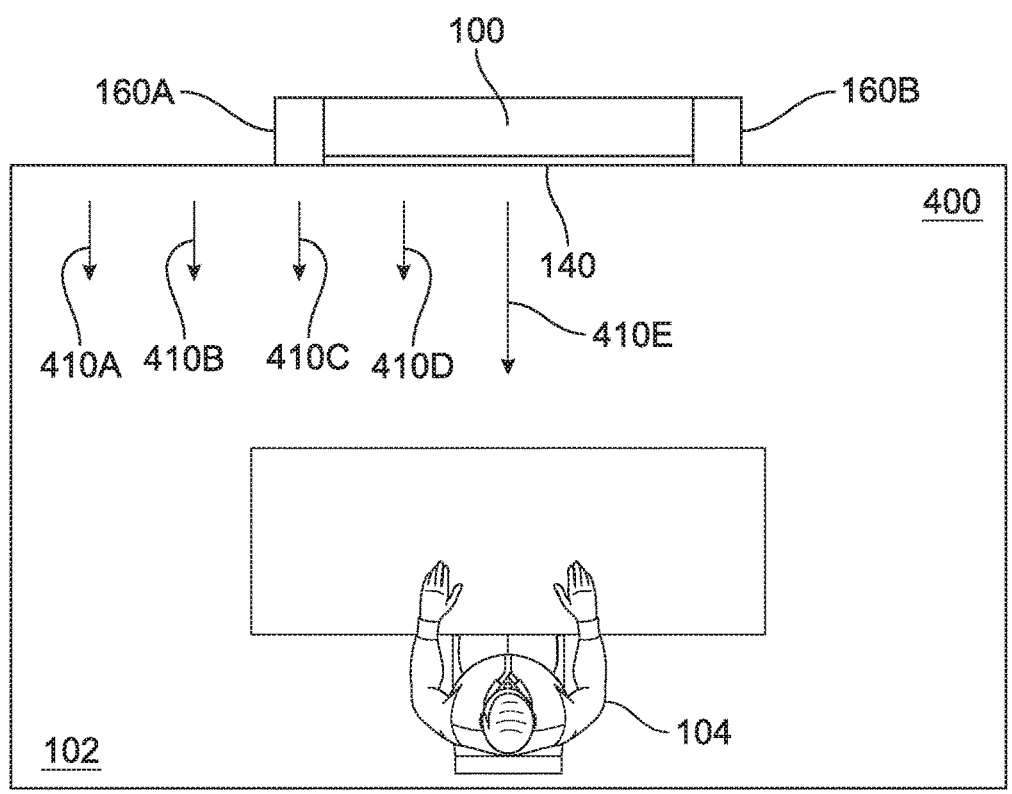

FIGS. 7A and 7B illustrate examples of the remote device 100 selecting and rendering a sound of the near end audio that matches the selected view displayed on the display 140. In FIGS. 7A and 7B, the remote user 104 is looking at the display 140 equipped with the one or more speakers 160A, 160B configured to create a spatial auditory scene 400 at the remote site 120. When the full view 310 or fit view 320 (illustrated in FIG. 5) is selected, the controller 120 may select a full auditory sound to match the full or fit view 310, 320. An exemplary full auditory scene at the remote site 102 is visually illustrated in FIG. 7A, in which sound beams 410A, 410B, 410C, 410D, 410E (concurrently referred to hereinafter as sound beams 410) are rendered by the speakers 160A, 160B. The sound beams 410A, 410B, 410C, 410D, 410E correspond to the voices 222A, 222B, 222C, 22D, 222E captured the near end device 200, respectively. When the full auditory sound is selected, each sound beam 410 may be rendered to be aligned with the location of the corresponding near end subject 204 displayed on the display 140. For example, in the full view 310 or fit view 320 (illustrated in FIG. 5), the near end subject 204C may be located at the center of the display 140. Hence, the sound beam 410C corresponding to the voice 222C of the near end subject 204C may be rendered to be beaming from the center of the display 140. Similarly, the sound beam 410A corresponds to the voice 222 of the near end subject 204A on the far left may rendered to beam from the far-left side of the display 140.

When the narrow view 340 (illustrated in FIG. 5) is selected, the near end subject 204E on the far right may be prominently displayed at the center of on the display 140. Then, the controller 120 may select the narrow beam sound to match the selected narrow view 340. For example, as illustrated in FIG. 7B, when the narrow beam sound is selected, the entire sound beams 410 may be shifted to the left such that the sound beam 410E corresponding to the voice 222E of the near end subject 204E is rendered to beam from the center of the display 140. The sound beam 410E may also be rendered to be louder than other sound beams 410A, 410B, 410C, 410D. As such, by matching the near end image view and near end sound, the remote user 104 may more easily distinguish each voice based on its spatial coordination. This may prevent the remote user 104 from becoming confused or disoriented even when two or more near end subjects 204 are speaking simultaneously.

FIGS. 8A, 8B and 8C illustrate various exemplary implementations for the automatic selection control scheme by the remote device 100. In the implementation shown in FIG. 8A, the near end device 200 may capture the near end video image and audio and send the near end video data 206 and near end audio data 208 to the remote device 100. For example, the near end video data 206 may capture the full view 310 (illustrated in FIG. 5) of the near end site 202. The near end audio data 208 may capture a full auditory spatial sound of the near end site 202. The controller 102 may then process the received near end video and audio data 206, 208 to generate a view and sound selected to be displayed and rendered by the remote device 100. In this scheme, the remote device 100 may perform most of the processing to generate the selected view and sound, and the near end device 200 may not need to generate any particular view and sound for the remote device 100. Instead, the near end device 200 may include video image information of the captured near end video image in the near end video data 206. The video image information may include captured video image size, resolution and coordinate, which may be used by the remote device 100 to display the selected view. Similarly, the near end device 200 may include audio information of the captured near end audio in the near end audio data 208. The audio information may include a coordinate of each sound beam in the captured near end spatial audio, which may be used by the remote device 100 to render the selected sound. In this implementation, any device having video/audio capturing features may be used as the near end device 200.

In the implementation shown in FIG. 8B, the remote device 100 may send the control data 106 to the near end device 200 to indicate the view and sound selected by the remote device 100. In response to the control data 106, the near end device 200 may send the near end video data 206 capturing the selected view and the near end audio data 208 capturing the selected sound. For example, referring to FIG. 5, when the controller 120 sends the control signal requesting a narrow view of the near end subject 204E, the near end device 200 may send the near end video data 206 capturing the narrow view 340. The near end device 200 may also send the near end audio data 208 capturing the focused beam sound centering the voice 222E of the near end subject 204E. In this implementation, both capturing and processing may be mostly done by the near end device 200. Hence, any device that can play video and audio in real time may be used as the remote device 100.

In the implementation shown in FIG. 8C, the near end device 200 may provide a number of near end video data streams 206A, 206B, 206C and a number of near end audio data streams 208A, 208B, 208C to the remote device 100. Each of the near end video data streams 206A, 206B, 206C may capture a different view of the near end video image, and each of the near end audio data streams 208A, 208B, 208C may capture a different sound of the near end audio. In this implementation, the remote device 100 may not need to send the control data 106. Instead, the remote device 100 may select one of the near end video data streams 206A, 206B, 206C to select the view to be displayed by the remote device 100. The remote device 100 may also select one of the near end audio data streams 208A, 208B, 208C to select the sound to be rendered by the remote device 100. The near end video data streams 206A, 206B, 206C may include captured view information, such as, a view type (e.g., full, fit or narrow view), view size and view coordinates. The near end audio data streams 208A, 208B, 208C may include captured sound information, such as sound beam coordinates. The remote device 100 may use the captured view and audio information to identify the near end video and audio steams to be selected.

Figure 9:
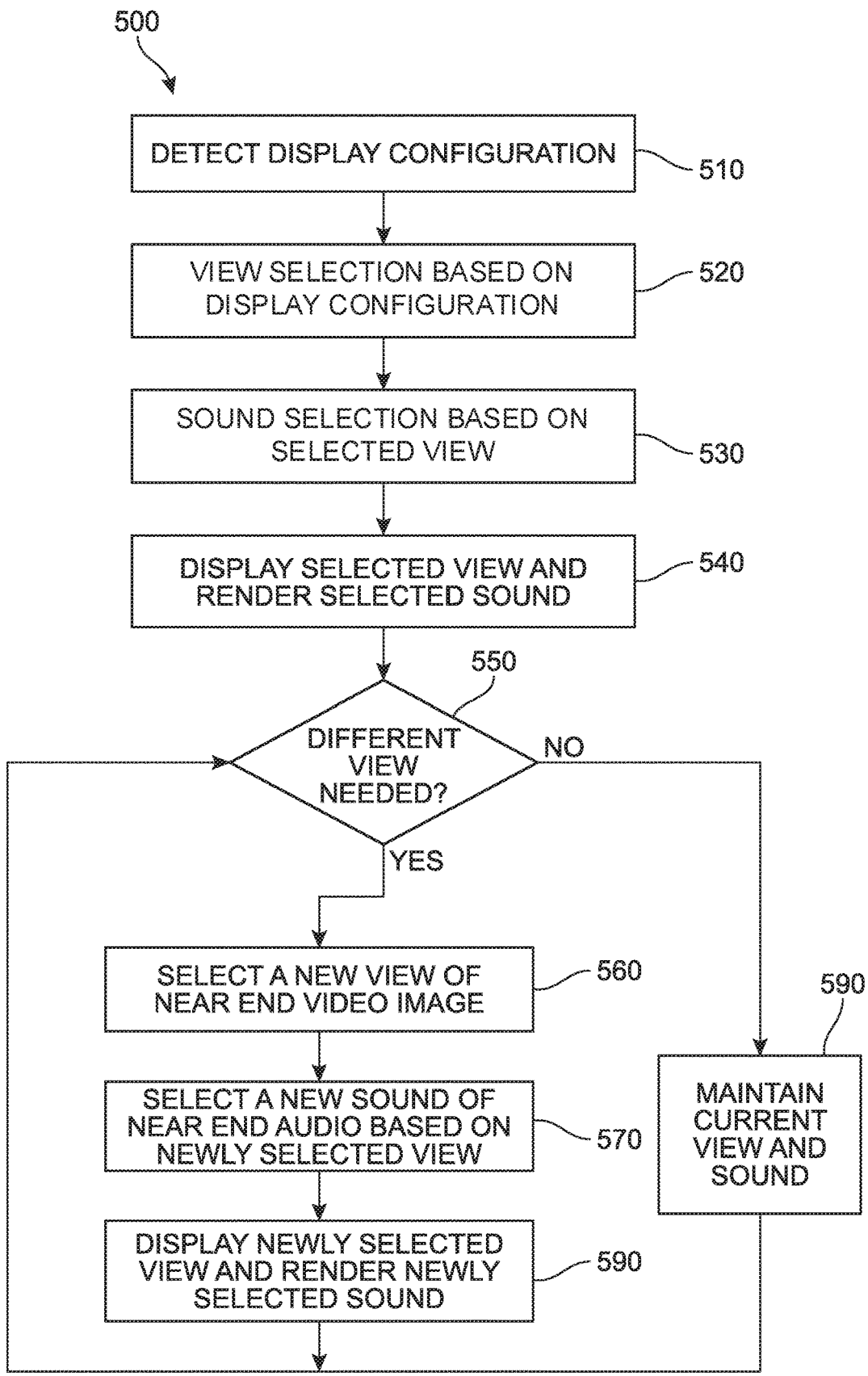
FIG. 9 illustrates a flowchart of an exemplary process for operating the remote device.

FIG. 9 illustrates a flowchart of an exemplary process 500 for operating the remote device 100. Upon starting the process 500, the controller 120 may detect the display configuration, such as a display size and resolution (Step 510). The controller 120 may then select a view of the near end video site 202 captured by the near end device 100 to be displayed on the display 140 (Step 520). The view may be selected based on the display configuration detected, as described above. The controller 120 may then select a sound of the near end audio captured by the near end device 200 to be rendered by the speakers 160A, 160B. As described above, the controller 120 may select the sound to match the view selected (at Step 520) to be displayed on the display 140. The remote device 100 may then display the selected view on the display 140 and render the selected sound via the speakers 160A, 160B (Step 540).

During a course of the videoconference or multicasting, an evident may occur and the remote device 100 may need to display a different view. When the controller 120 determines that a different view needs to be displayed (YES at Step 550), the controller 120 may select a new view (Step 560). For example, when the near end subjects 204E is actively speaking, the controller 120 may select the narrow view 340 to prominently display the near end subject 204E. The controller 120 then select a new sound (Step 570). As described above, the new sound may be selected to match the newly selected view (at Step 560). For example, when the narrow view 340 showing the near end subject 204E is selected as the new view, the controller 120 may select the narrow beam sound as the new sound to center the beam sound 410E, as shown in FIG. 7B. The controller 120 may then operate the display 140 to display the selected view and the speakers 160A, 160B to render the selected narrow beam sound (Step 590). Upon completing the selection, displaying and rendering of the new view and sound, the process 500 may loop back to determine whether a different view is needed (at Step 550). If a different view is not needed (NO at Step 550), the process 500 may also loop back to determine whether a different view is needed (at Step 550), which may be periodically performed, for example, in every two seconds.

In another implementation, once the near end view and sound are selected (Steps 520, 530) based on the display configuration, the controller 120 may not change the view and sound. For example, when the display size is too small to display the fit or full view on the remote device 100, such as the mobile device 100A shown in FIG. 2A, or the actual display size of the window (shown in FIG. 10A) of the display is too small, the controller 120 may select the narrow view and narrow beam sound and maintain the selected narrow view and narrow beam sound to avoid the displayed near end video image becoming too small for the remote user 104. Similarly, the controller 120 for the large format display 100D shown in FIG. 2D may switch between the full view and fit view but may not switch to the narrow view in any event to avoid the displayed near end video image becoming too large for the remote users 104.

Figure 10A:
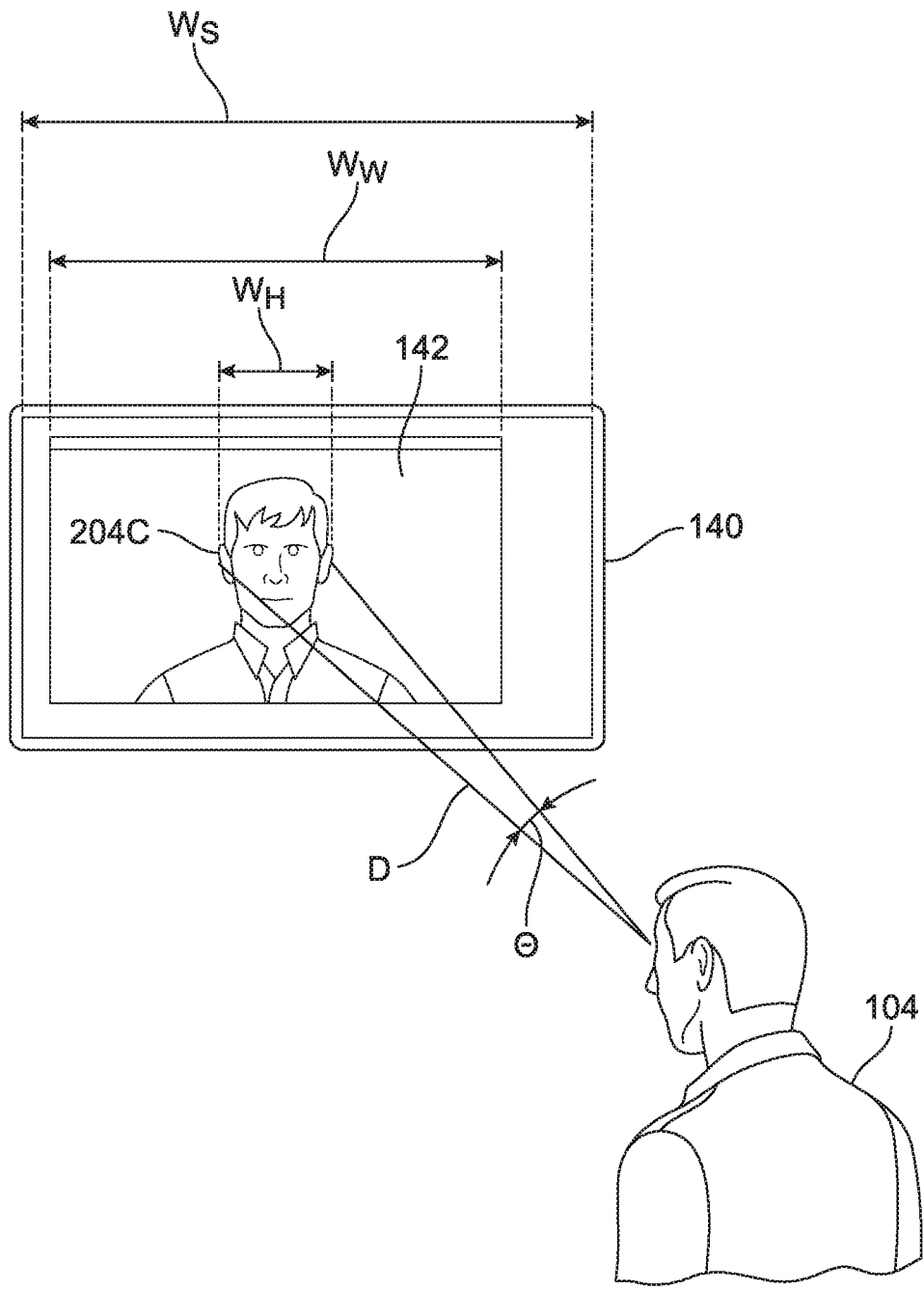
FIG. 10A illustrates an exemplary narrow view of an active speaker displayed on the display of the remote device.

FIG. 10A illustrates an exemplary view of an active speaker displayed on the display 140 of the remote device 100. The controller 120 may be configured to optimize the size of the active speaker displayed on the display 140. For example, when the near end subject 204C is actively speaking at the remote site 202, the controller 120 may select the narrow view 330 (illustrated in FIG. 5) of the near end subject 204C. As illustrated in FIG. 10A, a window 142 may be open on the display 140 to display the narrow view 330. The controller 120 may be configured to adjust the view such that the size of the near end subject 204C displayed on the display 140 may be optimized for the remote user 104. For example, the controller 140 may determine how large or small angular head width $\Theta$ should be. The angular head width $\Theta$ may span along a head width $W_H$ of the near end subject 204C. When the angular head width $\Theta$ is too large or too small, the remote user 104 may feel that more or less than a necessary amount of visual information is displayed, which may distract the remote user 104. Hence, the controller 120 may be configured to adjust the head width $W_H$ such that the angular head width Θ on the display 140 may not become too large or too small.

To determine the angular head width Θ of the remote user 204C, the controller 120 may determine a proportion $P_1$ of the head width $W_H$ to a width $W_W$ of the window 142 and a proportion $P_2$ of the window width $W_W$ to a width $W_D$ of the display 140. The rendered head width W may be calculated by multiplying the display width $W_D$ (m), the proportion $P_1$ (%) and the proportion $P_2$ (%). The angular head width Θ may be determined from Θ=arctan (W/D). The distance D may be detected by using a depth sensor or camera. Alternatively, the distance D may be estimated based on the type of the remote device 100. For example, the estimated distance D for the mobile phone or tablet 100A (illustrated in FIG. 2A) may be about 0.3 m, about 0.5 m for a laptop, about 0.8 m for the desktop monitor 100B (illustrated in FIG. 2B), about 2 m for a television, and about 3 m for the projection device 100C (illustrated in FIG. 2C).

Figure 10B:
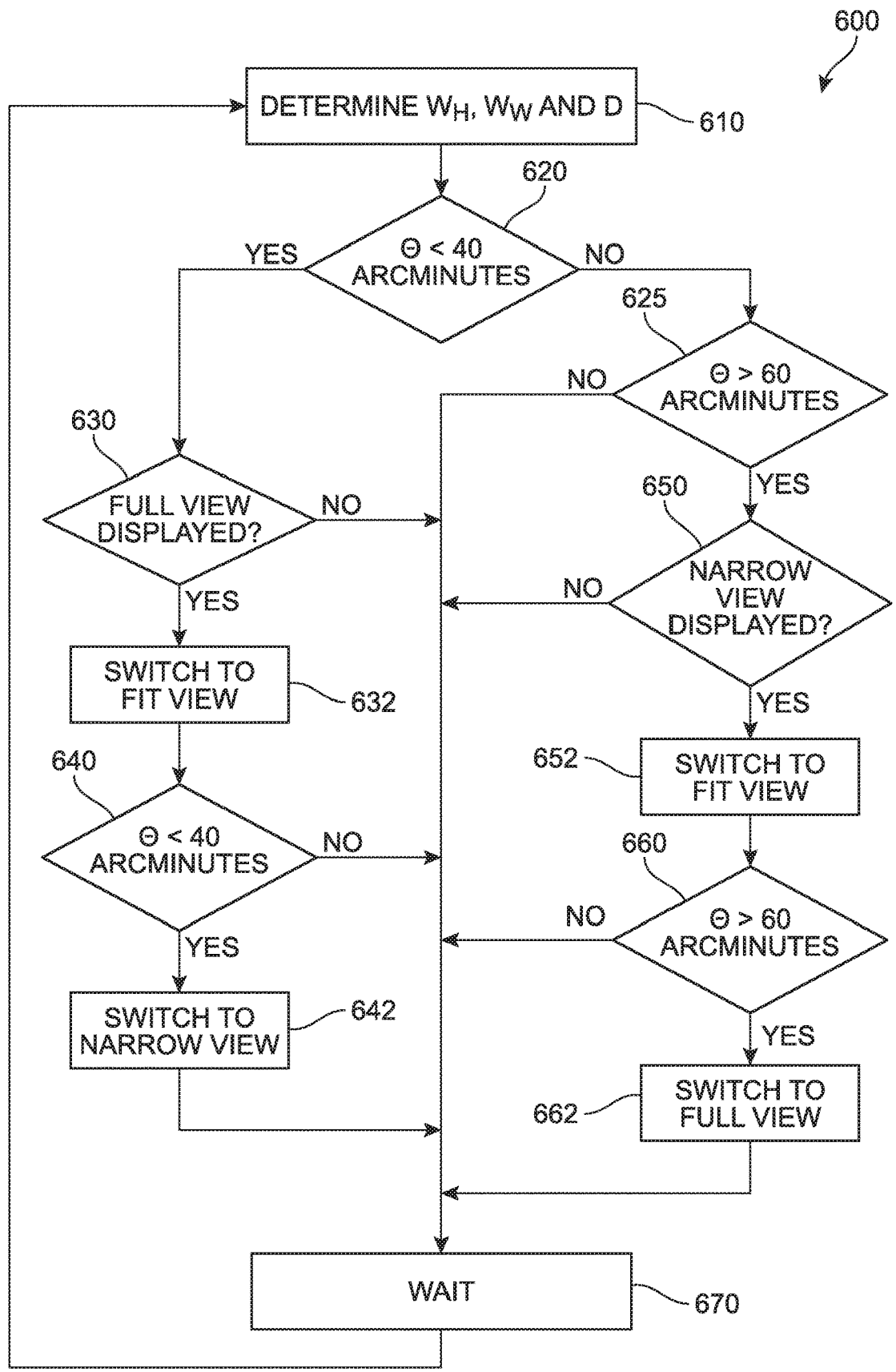
FIG. 10B illustrates an exemplary process for automatically selecting a view of the near end site optimized for the display configuration of the remote device.

FIG. 10B illustrates an exemplary process 600 for automatically selecting a view of the near end site 202 optimized for the display configuration of the remote device 100. Upon starting the process 600, the controller 120 may determine the head width $W_H$, the window Width $W_W$ and the distance D (Step 610) to determine the rendered head width W and angular head width Θ. As described above, the distance D of the remote user 104 may be detected or estimated, and the angular head width Θ may be determined based on the rendered head width W and distance D. The controller 120 may then determine whether the angular head width Θ is within a predetermined range, for example, between about 40 arcminutes and about 60 arcminutes. When the angular head width Θ is less or greater than the predetermined range, the controller 120 may switch the view to increase or decrease the angular head width Θ such that the angular head width Θ is maintained within the predetermined range. For example, the controller 120 may determine whether the angular head width Θ is less than 40 arcminutes (Step 620). When the angular head width Θ is less than 40 arcminutes (YES at Step 620), the controller 630 may determine whether a full view is displayed on the display 140 (Step 630). When the full view is displayed (YES at Step 630), the controller 120 may switch the view to a fit view such (Step 632) such that the angular head width Θ may become larger. The fit view may be captured by zooming in the camera 210 to increase the head width $W_H$. When the full view is not displayed (NO at Step 630), the controller 120 may wait for a predetermined period, for example, two seconds (Step 670) and the process 600 may loop back to Step 610 to determine a new angular head width Θ. After switching to the fit view (at Step 632), the controller 120 may determine whether the angular head width Θ is still less than 40 arcminutes (Step 640). If the angular head width Θ is still less than 40 arcminutes (YES at Step 640), the controller 120 may switch the view to a narrow view (Step 642) to further increase the angular head width Θ. Once the view is switched to the narrow view (at Step 642) or when the angular head width Θ is no longer less than 40 arcminutes (NO at Step 640), the controller 120 may wait for the predetermined period (Step 670) and the process 600 may loop back to Step 610 to determine a new angular head width Θ.

When the angular head width Θ is not less than 40 arcminutes (NO at Step 620), the controller 120 may determine whether the angular head width Θ is greater than 60 arcminutes (Step 625). When the angular head width Θ is not greater than 60 arcminutes (NO at Step 625), the angular head width Θ is determined to be within in the predetermined range and the process 600 may proceed to Step 670. When the angular head width Θ is greater than 60 arcminutes (YES at Step 625), the controller 120 may determine whether the narrow view is currently being displayed (Step 650). When the narrow view is displayed (YES at Step 650), the controller 120 may switch the view to the fit view to decrease the angular head width Θ (Step 652). When the current view is not the narrow view (NO at Step 650), the process 600 may move to Step 670. After switching to the fit view, the controller 120 may check if the angular head width Θ is still greater than 60 arcminutes (Step 660). If the angular head width Θ has become less than 60 arcminutes (NO at Step 660), the process 600 may move to Step 670. If the angular head width Θ is still greater than 60 arcminutes (YES at Step 660), the controller 120 may switch to the full view to further decrease the angular head width Θ (Step 662) and the process 600 may move to Step 670. Hence, the controller 120 may be configured to periodically determine whether the remote device 100 is displaying a view optimized for the specific display configuration of the remote device 100 and automatically select and switch to a new view optimized for the remote device 100.

As such, according to the description, the remote device 100 may have a complete control over how the near end site 202 should be displayed and how the sound of the near end site 202 should be rendered at the remote device 100. Since the view and sound of the near end site 202 may be selected based on its own display configuration, the remote device 100 may provide an improved videoconferencing or multicasting experience to the remote user 104. Also, the sound of the near end site may be selected to match the selected view of the near end site, which may provide more immersive videoconferencing or multicasting experiences. Further, the remote device 100 may periodically check if new view and sound need to be selected and switch to the new view and sound if necessary. Hence, the remote device 100 may provide more engaging and dynamic videoconferencing or multicasting experiences to the remote user 104.

Figure 11:
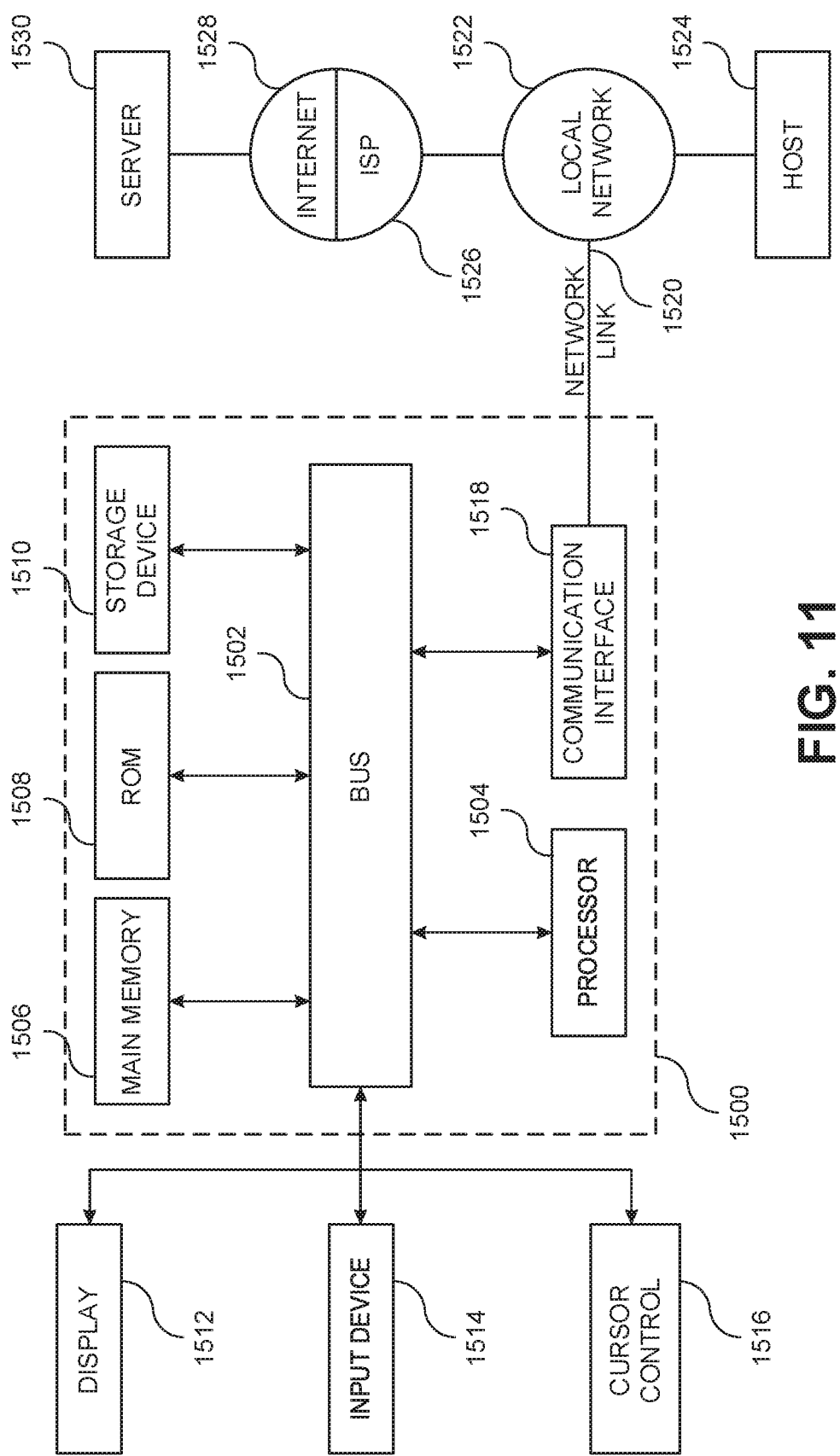
FIG. 11 illustrates a block diagram showing an example computer system upon which aspects of this disclosure may be implemented.

FIG. 11 illustrates a block diagram showing an exemplary computer system 1500 upon which aspects of this disclosure may be implemented. The computer system 1500 includes a bus 1502 or other communication mechanism for communicating information, and a processor 1504 coupled with the bus 1502 for processing information. The computer system 1500 also includes a main memory 1506, such as a random-access memory (RAM) or other dynamic storage device, coupled to the bus 1502 for storing information and instructions to be executed by the processor 1504. The main memory 1506 also may be used for storing temporary variables or other intermediate information during execution of instructions to be executed by the processor 1504. The computer system 1500 can implement, for example, one or more of, or portions of the remote device 100, the near end device 200 and/or the cloud server 20.

The computer system 1500 may further include a read only memory (ROM) 1508 or other static storage device coupled to the bus 1502 for storing static information and instructions for the processor 1504. A storage device 1510, such as a flash or other non-volatile memory can be coupled to the bus 1502 for storing information and instructions.

The computer system 1500 may be coupled via bus 1502 to a display 1512, such as a liquid crystal display (LCD), for displaying information. One or more user input devices, such as the example user input device 1514 can be coupled to the bus 1502, and can be configured for receiving various user inputs, such as user command selections and communicating these to the processor 1504, or to the main memory 1506. The user input device 1514 can include physical structure, or virtual implementation, or both, providing user input modes or options, for controlling, for example, a cursor, visible to a user through display 1512 or through other techniques, and such modes or operations can include, for example virtual mouse, trackball, or cursor direction keys.

The computer system 1500 can include respective resources of the processor 1504 executing, in an overlapping or interleaved manner, respective program instructions. Instructions may be read into the main memory 1506 from another machine-readable medium, such as the storage device 1510. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as the storage device 1510. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

The computer system 1500 can also include a communication interface 1518 coupled to the bus 1502, for two-way data communication coupling to a network link 1520 connected to a local network 1522. The network link 1520 can provide data communication through one or more networks to other data devices. For example, the network link 1520 may provide a connection through the local network 1522 to a host computer 1524 or to data equipment operated by an Internet Service Provider (ISP) 1526 to access through the Internet 1528 a server 1530, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A first device located at a first site and in communication with a second device located at a second site, comprising:
  a processor; and
  a memory in communication with the processor, the memory comprising executable instructions that, when executed by the processor, cause the processor to control the first device to perform functions of:
    determining a display configuration of a display device located at the first site;

transmitting, via a communication network to the second device, a control signal configured to control the second device to select, based on the display configuration, an area of the second site to be captured by the second device;

receiving, via the communication network, video data including a view of the selected area of the second site and spatial audio data including a sound captured at the second site and coordinate information of the captured sound;

causing the display device to display, based on the received video data, a video image showing the view of the selected area of the second site;

processing, based on the view of the selected area of the second site, the received spatial audio data to generate audio data that spatially corresponds to the view of the selected area of the second site; and causing an audio device located at the first site to generate, based on the generated audio data, an audio of the second site.

2. The first device of claim 1, wherein the display configuration includes at least one of a size and resolution of the display of the first device.

3. The first device of 1, wherein the view of the selected area of the second site comprises one of:
a full view that defines a substantially entire area of the second site;
a fit view that defines a first partial area of the second site that is prominently occupied by a plurality of subjects at the second site; and
a narrow view that defines a second partial area of the second site that is prominently occupied by an active speaker of the plurality of subjects.

4. The first device of claim 3, wherein, for causing the audio device to generate an audio of the second site, the instructions, when executed by the processor, cause the processor to control the first device to perform a function of causing, when the full view or fit view is displayed on the display, the audio device to generate a full auditory sound of the second site spatially aligned with a position of each subject.

5. The first device of claim 3, wherein, for causing the audio device to generate an audio of the second site, the instructions, when executed by the processor, cause the processor to control the first device to perform a function of causing, when the narrow view is displayed on the display, the audio device to generate a focused beam sound that renders a voice of the active speaker more prominently than other voices captured by the second device.

6. The first device of claim 1, wherein the video data includes coordinate data for a plurality of views selectable by the first device.

7. The first device of claim 6, wherein the instructions, when executed by the processor, further cause the processor to control the first device to perform a function of processing, based on the coordinate data, the received video data to generate the view of the selected area of the second site.

8. A method of operating a first device located at a first site and in communication with a second device located at a second site, comprising:
determining a display configuration of a display device located at the first site;
transmitting, via a communication network to the second device, a control signal configured to control the second device to select, based on the display configuration, an area of the second site to be captured by the second device;
receiving, via the communication network, video data including a view of the selected area of the second site and spatial audio data including a sound captured at the second site and coordinate information of the captured sound;
causing the display device to display, based on the received video data, a video image showing the view of the selected area of the second site;
processing, based on the view of the selected area of the second site, the received spatial audio data to generate audio data that spatially corresponds to the view of the selected area of the second site; and
causing an audio device located at the first site to generate, based on the generated audio data, an audio of the second site.

9. The method of claim 8, wherein the display configuration includes at least one of a size and resolution of the display of the first device.

10. The method of claim 8, wherein the view of the selected area of the second site comprises one of:
a full view that defines a substantially entire area of the second site;
a fit view that defines a first partial area of the second site that is prominently occupied by a plurality of subjects at the second site; and
a narrow view that defines a second partial area of the second site that is prominently occupied by an active speaker of the plurality of subjects.

11. The method of claim 10, wherein causing the audio device to generate an audio of the second site comprises causing, when the full view or fit view is displayed on the display, the audio device to generate a full auditory sound of the second site spatially aligned with a position of each subject.

12. The method of claim 10, wherein causing the audio device to generate an audio of the second site comprises causing, when the narrow view is displayed on the display, the audio device to generate a focused beam sound that renders a voice of the active speaker more prominently than other voices captured by the second device.

13. The method of claim 8, wherein the video data includes coordinate data for a plurality of views selectable by the first device, and
the method further comprises processing, based on the coordinate data, the received video data to generate the view of the selected area of the second site.

14. A non-transitory computer readable medium containing instructions which, when executed by a processor, cause a first device to perform functions of:
determining a display configuration of a display device located at the first site;
transmitting, via a communication network to the second device, a control signal configured to control the second device to select, based on the display configuration, an area of the second site to be captured by the second device;
receiving, via the communication network, video data including a view of the selected area of the second site and spatial audio data including a sound captured at the second site and coordinate information of the captured sound;
causing the display device to display, based on the received video data, a video image showing the view of the selected area of the second site;
processing, based on the view of the selected area of the second site, the received spatial audio data to generate audio data that spatially corresponds to the view of the selected area of the second site; and causing an audio device located at the first site to generate, based on the generated audio data, an audio of the second site.

15. The first device of claim 1, wherein the sound included in the spatial audio data comprises a plurality of sound beams captured at the second site, and the coordinate information comprises a spatial coordinate of each sound beam.

16. The first device of claim 15, wherein, for processing the received spatial audio data, the instructions, when executed by the processor, further cause the processor to control the first device to perform a function of spatially shifting the plurality of sound beams based on the view of the selected area of the second site.

17. The first device of claim 15, wherein, for generating the audio data, the instructions, when executed by the processor, further cause the processor to control the first device to perform a function of increasing a volume of one of the plurality of sound beams based on the view of the selected area of the second site.

18. The first device of claim 8, wherein the sound included in the spatial audio data comprises a plurality of sound beams captured at the second site, and the coordinate information comprises a spatial coordinate of each sound beam.

19. The first device of claim 18, wherein, for processing the received spatial audio data, the instructions, when executed by the processor, further cause the processor to control the first device to perform a function of spatially shifting the plurality of sound beams based on the view of the selected area of the second site.

20. The first device of claim 18, wherein, for generating the audio data, the instructions, when executed by the processor, further cause the processor to control the first device to perform a function of increasing a volume of one of the plurality of sound beams based on the view of the selected area of the second site.

* * * * *